US009544744B2

(12) United States Patent
Postrel

(10) Patent No.: US 9,544,744 B2
(45) Date of Patent: Jan. 10, 2017

(54) METHOD AND SYSTEM FOR PRE AND POST PROCESSING OF BEACON ID SIGNALS

(71) Applicant: Richard Postrel, Miami Beach, FL (US)

(72) Inventor: Richard Postrel, Miami Beach, FL (US)

( * ) Notice: Subject to any disclaimer, the term of this patent is extended or adjusted under 35 U.S.C. 154(b) by 0 days.

(21) Appl. No.: 14/172,875

(22) Filed: Feb. 4, 2014

(65) Prior Publication Data

US 2015/0140982 A1 May 21, 2015

Related U.S. Application Data

(60) Provisional application No. 61/904,879, filed on Nov. 15, 2013, provisional application No. 61/906,939, filed on Nov. 21, 2013, provisional application No. 61/929,569, filed on Jan. 21, 2014.

(51) Int. Cl.
*H04W 24/00* (2009.01)
*H04W 4/12* (2009.01)
*H04W 4/00* (2009.01)
*H04W 88/06* (2009.01)

(52) U.S. Cl.
CPC ............... *H04W 4/12* (2013.01); *H04W 4/008* (2013.01); *H04W 88/06* (2013.01)

(58) Field of Classification Search
USPC .................... 455/412.2, 452.2, 456.1–456.4, 456.6, 455/456.7, 458, 466, 513–514
See application file for complete search history.

(56) References Cited

U.S. PATENT DOCUMENTS

| 6,421,347 | B1 | 7/2002 | Borgstahl et al. |
| 8,059,491 | B1 | 11/2011 | Hennings-Kampa |
| 8,695,060 | B2* | 4/2014 | Wade ...................... G06F 21/54 |
| | | | 726/1 |
| 8,817,761 | B2* | 8/2014 | Gruberman ........... H04W 8/245 |
| | | | 370/338 |
| 9,125,001 | B2 | 9/2015 | Cedo Perpinya et al. |
| 9,226,224 | B1* | 12/2015 | Houri |
| 2003/0119530 | A1* | 6/2003 | Rankin ............. H04W 52/0241 |
| | | | 455/456.1 |

(Continued)

OTHER PUBLICATIONS

Sam Grobart, Apple's Location-Tracking iBeacon Is Poised for Use in Retail Sales, Bloomberg Business Week, Oct. 24, 2013.

(Continued)

*Primary Examiner* — Dai A Phuong
(74) *Attorney, Agent, or Firm* — Barkume & Associates, P.C.

(57) ABSTRACT

A wireless beacon message management system and method of operating the system with a mobile device. At least one wireless beacon is strategically located in a premises, such as a building or other geocentrically defined area. Each wireless beacon has means for transmitting a wireless beacon signal, wherein the wireless beacon signal includes a beacon data message that has a beacon identification that identifies the beacon transmitting the signal, and optionally the content being delivered. A mobile device such as a smartphone, tablet or the like receives the wireless beacon signal and analyzes it to extract the beacon identification and optional beacon content. The mobile device may then apply one or more software filters to the beacon data message that enables the mobile device to initiate an action based on the filtered beacon data message.

64 Claims, 13 Drawing Sheets

(56) References Cited

U.S. PATENT DOCUMENTS

| | | | |
|---|---|---|---|
| 2004/0203863 A1* | 10/2004 | Huomo | H04W 4/02 455/456.1 |
| 2005/0128995 A1 | 6/2005 | Ott et al. | |
| 2005/0249170 A1 | 11/2005 | Salokannel et al. | |
| 2007/0271387 A1 | 11/2007 | Lydon et al. | |
| 2009/0224909 A1* | 9/2009 | Derrick | G01S 5/0027 340/539.13 |
| 2009/0270092 A1* | 10/2009 | Buckley | H04W 48/20 455/434 |
| 2011/0028160 A1 | 2/2011 | Roeding et al. | |
| 2012/0022776 A1* | 1/2012 | Razavilar | G01C 21/3697 701/482 |
| 2013/0028177 A1 | 1/2013 | Koskela et al. | |
| 2013/0039275 A1* | 2/2013 | Patil | H04W 48/20 370/328 |
| 2013/0203445 A1 | 8/2013 | Grainger et al. | |
| 2013/0317944 A1 | 11/2013 | Huang et al. | |
| 2014/0108084 A1* | 4/2014 | Bargetzi | G06Q 10/1095 705/7.19 |
| 2014/0156460 A1* | 6/2014 | Fan | G06Q 30/0623 705/26.61 |
| 2014/0236474 A1* | 8/2014 | Hansen | G01C 21/206 701/408 |
| 2014/0282620 A1* | 9/2014 | Nuovo | G06F 17/30867 719/318 |
| 2015/0072618 A1* | 3/2015 | Granbery | H04W 4/008 455/41.2 |
| 2015/0081474 A1* | 3/2015 | Kostka | G06Q 30/0633 705/26.8 |
| 2015/0119071 A1* | 4/2015 | Basha | H04W 64/00 455/456.1 |
| 2016/0062873 A1* | 3/2016 | Cotugno | G06F 9/44 717/131 |

OTHER PUBLICATIONS

Simon Baldwin, Apple iBeacons: what are they and what do they mean for retail?, theguardian, 2013.

Ryan Matzner, Why Retailers+Developers Should Pay Attention to Apple's iBeacon, Huff Post Tech, Nov. 14, 2013, http://www.huffingtonpost.com/fueled/why-retailers-developers-_b_4260561.html.

Natasha Baker, How Apple's iBeacon Will Change Everything for Retail Analytics, Forbes, Oct. 31, 2013, http://www.forbes.com/sites/centurylink/2013/10/31/how-apples-ibeacon-will-change-everything-for-retail-analytics/.

Estimote, API Documentation, Nov. 14, 2013, http://estimote.com/api/index.html.

* cited by examiner

METHOD AND SYSTEM FOR PRE AND POST PROCESSING OF BEACON ID SIGNALS

TECHNICAL FIELD

This application relates generally to wireless beacon systems, and in particular to a system and method for a mobile device to manage signals received from one or more wireless beacons, including dedicated beacons as well as mobile smartphone beacons such as those generated by a mobile smartphone or tablet.

BACKGROUND OF THE INVENTION

Wireless beacons are devices that generate and transmit wireless signals in a relatively small area of coverage. For example, a recent commercial product known as iBeacon from APPLE, INC. is an indoor positioning system that uses Low Energy Bluetooth (BLE) (also referred to as Bluetooth 4.0 and Bluetooth Smart). Essentially, the iBeacon technology enables nearby mobiles device (such as an IPHONE running IOS or an ANDROID device) to receive and send messages over greater distances than NFC technology (near field communications). For example, the iBeacon can send messages over 150 feet. This technology is superior to GPS insofar as indoor locations are concerned since GPS relies on communications with a GPS satellite, which is generally not available in an indoor environment. In addition, this technology enables much more precision in locating the user and his mobile device.

A beacon in this respect may be a dedicated device or it may be embodied in a mobile smartphone having the appropriate hardware and software configurations. In the first case of a dedicated device, it is envisioned that retail stores and other physical locations would place these dedicated wireless beacons throughout their premises, so as to enable the beacons to communicate with the users' mobile devices as they approach, browse around, and leave the store. Dedicated beacons could operate in a stand-alone or networked environment. When operating stand-alone, they emit signals that are detected by a user's mobile device and processed by the mobile device (in standalone mode or in connection with services in the cloud (i.e. the Internet)) to provide various services and information. By interconnecting the dedicated beacons on a network to a central server computer or to services in the cloud, the system could track a user at any given time and communicate with that user. For example, the system could determine that the user is in a magazine aisle in a grocery store, and as a result send a coupon for a magazine to that user's mobile device at that time. Or, the system could determine that user is standing near a product and send information about that product (or complimentary products) to the user at that time. In another example, a user may be visiting a museum, and strategically placed dedicated beacons could track his location throughout the museum and push information about objects in the museum that the user is currently viewing.

Besides the dedicated beacons that operate in stand-alone mode, networked mode, and/or cloud-based mode, a mobile device such as a mobile smartphone or tablet may be configured to operate as a beacon and provide additional services and features as will be described.

As the use of wireless beacons proliferates, it has become apparent that a user will quickly become bombarded with wireless messages from the multitude of beacons which may surround him. For example, a user may enter a shopping mall and be surrounded by dozens if not hundreds of beacons, all of which may be competing for the user's attention. The user's mobile device may begin to receive hundreds of wireless messages, and it is likely that user may simply ignore his device or even turn it off, in an effort to avoid being bombarded with message after message after message, many of which may be of little or no interest to that user. The present invention addresses and solves this problem and will be described in further detail below.

SUMMARY OF THE INVENTION

Accordingly, provided is a first aspect of the invention in which implements a wireless beacon message management system and method of operating the system within a mobile device. At least one, and likely many, wireless beacon(s) is (are) strategically located in a premises, such as a building or other geocentrically defined area such as a shopping mall, stadium, museum, etc. Each wireless beacon has means for transmitting a wireless beacon signal, wherein the wireless beacon signal includes at least a beacon identifier that identifies the beacon transmitting the signal, and in some embodiments the wireless beacon signal may also include a beacon data message that includes the content being delivered. A mobile device such as a smartphone, tablet or the like receives the wireless beacon signal and analyzes it to determine the beacon identifier. A beacon filter manager running on the mobile device or in the cloud may then pre=process the beacon identifier by applying one or more software filters to the beacon identifier that enables the mobile device to initiate an action as desired. The mobile device then may enable a mobile application associated with the beacon identifier to process the beacon identifier if allowed by the beacon filter manager. Although it is envisioned that these beacons will be dedicated, a mobile smartphone beacon may also be used in this aspect of the invention to generate the beacon signals as described herein.

The beacon identifier may include a source identifier, a major location identifier, and a minor location identifier. The source identifier indicates the source or owner of the beacon, such as a department store chain, which will be used to trigger an associated mobile app if certain filter conditions are met. The major location identifier may be used to indicate a general location of the beacon, such as a store address. The minor location identifier may be used to indicate a specific location within the major location identifier, such as an entry door, a specific department location, a specific floor in the store, etc.

The receiving mobile device pre-processes the wireless beacon signal with the beacon filter manager, which may execute locally on the mobile device (either within the operating system or with a separate application called by the operating system) or remotely using cloud-based services. The location services function of the mobile device will make available the beacon identifier which normally would then be used to trigger or call an associated mobile application that is loaded or executing on the mobile device.

The beacon filter manager analyzes the beacon identifier and initiates one or more actions based on the beacon identifier, optionally in conjunction with a user profile stored in memory on the mobile device or in the cloud to provide actions that are tailored to the user of the device. For example, one filter that may be applied to the beacon data message indicates that the beacon identifier should be ignored, such that the action initiated by the mobile device is simply to ignore the beacon identifier as if it had not been received. This may occur if a user indicates in his profile that beacons from certain sources should be ignored, which may be based on certain conditions such as time of day, day of the week, etc.

Another type of action taken may be to simply display a notification to the user that the source identified by the beacon identifier is transmitting a beacon signal to the mobile device. Optionally, the user may be given the ability to confirm that the mobile app associated with that beacon source may be triggered (such that the app will take certain actions such as displaying purchase incentives etc.) or to indicate that the beacon should be ignored. In this case the user is given the ability to filter out certain beacons in real time as desired. Another type of action that may be initiated is the automatic execution of a mobile application resident in memory of the mobile device.

Another type of action that may be initiated is the placement of the beacon identification in a transaction queue for subsequent processing. For example, a priority of service scheme may be implemented to handle multiple wireless beacon signals that may be received at around the same time in quick succession such as in a shopping mall in which all of the stores each use wireless beacons. These messages may be placed in a transaction queue and subjected to prioritization as determined by the user. For example, a simple FIFO (first in first out) scheme may be used to allow sequential processing in the order they are received. Or, the beacon identifier may be analyzed to determine if certain beacons are of immediate interest to the user and the given higher priority, such as if the user has configured the priority to process beacon signals associated with stores that sell electronic devices before any other type of beacon signal. This may of course be user-configurable wherein priority settings may be stored in the user profile, which may be in the mobile device or in storage in the cloud.

Another type of action that may be initiated is post-processing of data provided by execution of an app triggered by the beacon identifier. For example, the beacon filter manager may allow a beacon identifier to trigger a mobile app associated with an electronics store that the user is entering. The electronics store mobile app may operate to provide a purchase offer for display to the user on the mobile device. This purchase offer may be post-processed by sending a request to an external service in the cloud for analysis; for example a product comparison service, a web search service, or a transaction service. In the case of a product comparison service, the mobile device may be configured to request the service to provide a product comparison report from the product comparison service, which may include prices at various merchants for a product that is being offered by the mobile app. This would enable the user to quickly determine if the product offer is at a desired price, or if another merchant such as AMAZON may be selling the same product for a lower price. In the case of a web search service, the mobile device may be configured to request the service to execute a web search in real time regarding the subject matter of the data provided by the mobile app that was triggered by the beacon. For example, the triggered mobile app may provide information regarding a store that a user is entering; that information may be used to obtain a web search report via the web search action, which may have further information about the store. In the case of a transaction service, the triggered mobile app may display a purchase incentive such as a product coupon, and the coupon may then be used to execute an online purchase of the product using an appropriate transaction service. Transactions may be negotiated and executed if desired.

In accordance with a second aspect of the invention, the wireless beacon contains intelligence, or is interconnected with a server computer locally or in the cloud that provides intelligence, such that the beacon transmits more than just a beacon identifier as in the first aspect of the invention discussed above.

In particular, the intelligent beacon provides beacon content in addition to the beacon identifier, which may be acted on by the mobile device without the need to execute an associated mobile app to provide content to the user such as a purchase coupon. The intelligent beacon differs from the beacon of the first aspect above in that it includes processing circuitry and program storage that enable it to provide beacon content such as notifications, purchase incentives (i.e. coupons), and other information in addition to its beacon identifier as described above. This content may be generated and stored on the beacon itself or the beacon may interconnect to a beacon server computer on a local network or using cloud-based services. This enables an enterprise to program the intelligent beacons to deliver content as may be desired. For example, the enterprise may program the beacons to deliver $20 discount coupons for plasma TVs, or other type of beacon content, which may be changed by the enterprise when desired.

At the core of this second aspect of the invention is a beacon filter manager that is running on the mobile device and which provides certain application post-processing functions similar to what has been described above. The filter manager may be a separate application executed when desired by a user, or it may be tightly integrated into the operating system platform of the mobile device if desired by the system designer. Alternatively, the beacon filter manager may operate wholly or partially using cloud-based services.

The beacon filter manager analyzes the beacon data (the beacon identifier and/or beacon content) and initiates one or more actions based on the beacon data, optionally in conjunction with a user profile stored in memory on the mobile device or on a cloud-based server to provide actions that are tailored to the user of the device. Optionally, the beacon content may include a template that requires customization by the mobile device before continuing to process it.

One filter that may be applied to the beacon data indicates that the beacon data should be ignored. This may be determined by reference to a no-action table of beacon data established by the user in the user profile, such that if any of the beacon data matches the no-action table then the action initiated by the mobile device is simply to ignore the beacon data as if it had not been received. Beacon data may be ignored at all times, or it may be ignored at certain times of the day or days of the week, etc. The beacon data may be ignored as a function of the beacon identifier as described with respect to the first aspect of the invention above. Or the beacon data may be ignored as a function of the beacon content within the beacon data.

Another type of action taken by the filter manager may be to display a notification to the user on the mobile device of the source of the beacon data being transmitted to the mobile device. Optionally, the user may be given the ability to confirm that the beacon content should be displayed directly on the device without needing to invoke a mobile app, or that a mobile app associated with that beacon source may be triggered (such that the app will take certain actions such as displaying purchase incentives etc.), or to indicate that the beacon should be ignored.

Another type of action that may be initiated by the filter manager is the automatic execution of a mobile application resident in memory of the mobile device. That is, the user may initiate an override of any previously stored ignore commands in the no-action table, such that all beacon data would be passed on by the filter manager to an intended mobile app associated with the beacon content without any further interaction by the filter manager.

Another type of action that may be initiated is the placement of the beacon content in a transaction queue for subsequent processing. These messages may be placed in a transaction queue and subjected to prioritization as determined by the user in the user profile or on-the-fly as they are being received. For example, the user may specify that a simple FIFO (first in first out) scheme be used to allow sequential processing in the order they are received. Or, the beacon content (and/or identifier) may be analyzed to determine if certain beacons are of immediate interest to the user and then given higher priority, such as if the user has configured the priority to process beacon content related to electronic devices before any other type of beacon signal.

Similar to the first aspect of the invention described above in which an item such as a purchase offer generated by a mobile app associated with an incoming beacon identifier may be post-processed in one or more various manners (e.g. such as by a product comparison service), this second aspect of the invention provides for similar post-processing events to occur with respect to beacon content received directly from a beacon.

One type of post-processing action is a product comparison step, in which the mobile device may be configured to request a third party service in the cloud to provide a product comparison report which may include prices at various merchants for a product that is being offered by the beacon. Another type of post-processing action is the use of a web search service in which the mobile device may be configured to request the web search service to execute a web search in real time regarding the subject matter of the beacon content provided by the beacon. Another type of post-processing action is the use of a transaction service.

In an alternative embodiment, the beacon content may be in the form of a template such that each mobile device would take steps to complete or modify the template to present a message customized to the user of the mobile device. As explained above, the beacon filter manager determines if the beacon content may include a template that requires customization by the mobile device before continuing to process it. If so determined, then the template is extracted/decoded from the beacon content. One of three processing paths may then occur, based on what is required by the template. In the first path, the user profile is accessed from local or cloud-based storage, and information from that user profile is used to complete or modify the template. Then the completed template is passed back to the filter manager for processing. Alternatively, in the second path, a mobile app is accessed that is associated with the beacon identifier received and decoded by the mobile device in the wireless beacon data signal. The template is completed or modified by the mobile app, and then the completed template is passed back to the filter manager for processing. Optionally, the mobile app may also require information from the user profile to complete the template. Finally, in the third path, the template may be modified by interaction with the user and then passed back to the filter manager for processing as discussed above.

In an optional embodiment, the beacon may have the ability to receive data messages from a user mobile device as well as transmit the wireless beacon data signals as described above. In this manner, the beacon could request information from the user mobile device, which could respond based on information in the user profile or based on real-time interaction with the user. Additionally, the mobile device may be programmed to transmit periodic queries that search for beacons having certain characteristics. In this case, the user may be seeking to obtain purchase coupons for a desire product, and may set a mobile app on his device to transmit beacon search requests that would be received by beacons within range. If a particular beacon is able to provide the requested content, then it would respond to the querying mobile device accordingly.

In accordance with a third aspect of the invention, the beacon is a mobile smartphone beacon. That is, certain mobile devices such as an IPHONE running IOS 7 may act as a beacon in this environment so as to generate and transmit beacon signals.

Since these mobile devices also receive beacon signals, this provides for intelligent two-way interactions and conversations, thus enabling the features and functionality to be described herein.

In accordance with a fourth aspect of the invention, the user mobile device is capable of switching between GPS and beacon location modes, either automatically or manually, depending on the location of the device.

DESCRIPTION OF THE PREFERRED EMBODIMENTS

First Aspect of the Invention—ID Transmit Only Beacon

A detailed description of the first aspect of the invention will now be provided. In this aspect of the invention, the beacon is referred to as being dumb since it is capable of transmitting only a beacon identifier, and no other content, as will be discussed in conjunction with the other aspects of the invention below. References to a beacon in this first aspect of the invention should in most cases be construed as a dedicated beacon, but where appropriate a mobile smartphone beacon may also be used. This aspect of the invention is discussed with reference to FIGS. 1-3 herein.

Figure 1:
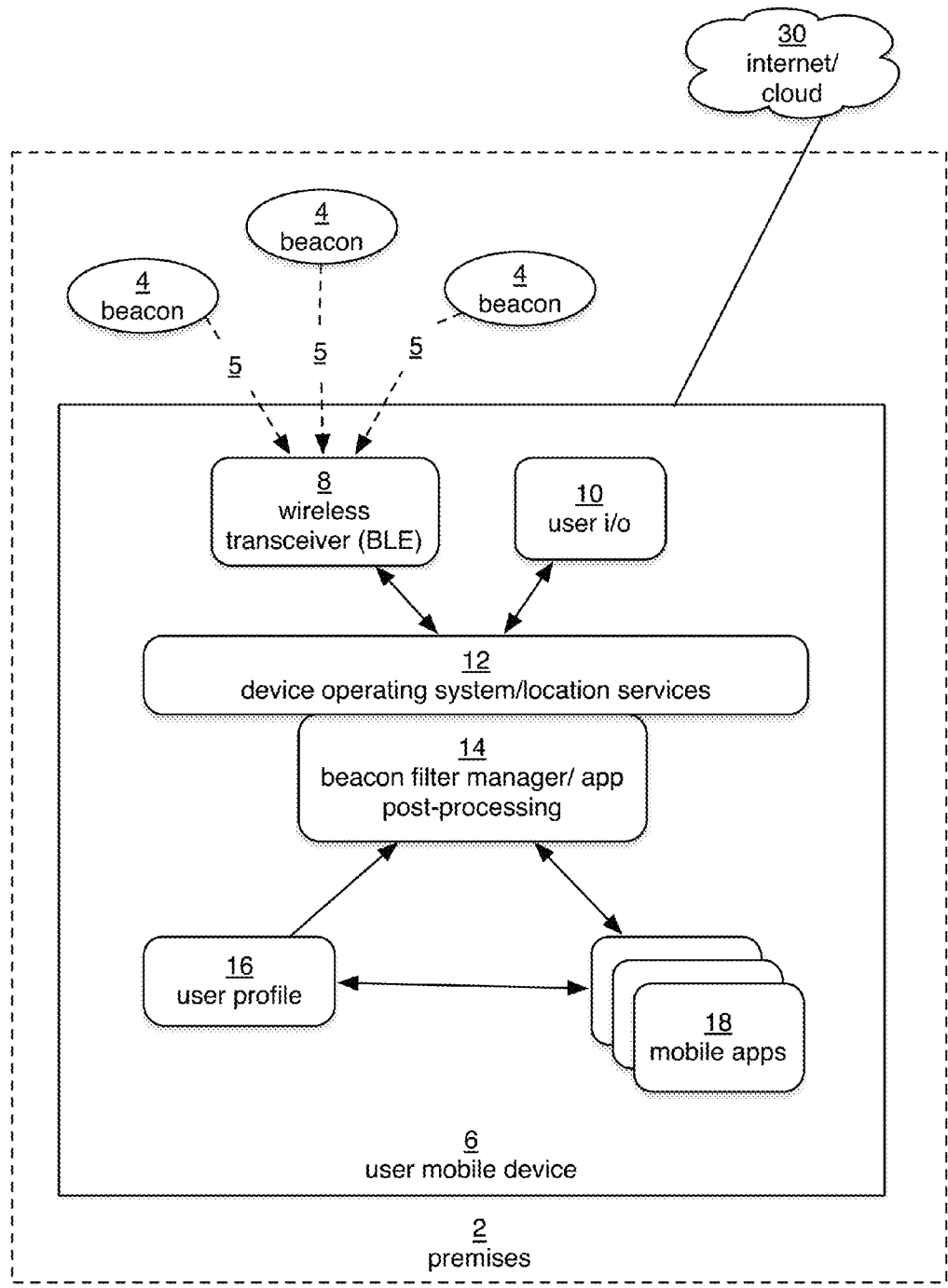
FIG. 1 is a system level block diagram of the preferred embodiment of the first aspect of the present invention.

FIG. 1 provides a basic block diagram of the system that implements a beacon 4 that transmits only a beacon identifier. These beacons 4 are simple and thus inexpensive, and may be easily deployed in a premises or other geocentric location 2 by an enterprise or any entity wanting to broadcast its identity. A commercial example of this type of beacon 4 is distributed by ESTIMOTE. According to the web site at www.estimote.com, the ESTIMOTE Beacon is a small computer with a CPU, memory, an accelerometer, a temperature sensor, and a 2.4 GHz Bluetooth Smart (otherwise referred to as BLE or Bluetooth low energy) bidirectional radio, and can run up to two years on a single battery. The beacon 4 broadcasts its presence by sending a wireless beacon ID signal 5 continuously so that devices such as the user mobile device 6 can receive and process it.

The mobile device 6 is capable of receiving the wireless beacon ID signal 5 via the wireless Bluetooth transceiver 8 once it is within range of the beacon 4, without the requirement of being previously paired with the beacon. The operating system and/or location services software 12 of the mobile device 6 is capable of measuring the RSSI (received signal strength indication) of the wireless signal 5, and as a result is able to provide a ranging function that ascertains how far the device 6 is from the transmitting beacon 4. By receiving signals from more than one beacon 4, the ranging accuracy is improved and the device 6 can more accurately determine its relative position with respect to the beacons 4. Ranging calculations are known in the art and need not be repeated here.

The mobile device processes the wireless signal 5 from the beacon 4 and then demodulates/decodes the data from the wireless signal to determine the beacon identifier. The beacon identifier will typically but not necessarily include a source identifier, a major location identifier, and a minor location identifier. The source identifier is also referred to as the proximity UUID, and may be a length of 16 bytes of data. This indicates the source or owner of the beacon, such as a department store chain, which will be used to trigger an associated mobile app if certain filter conditions are met. For example, the department store chain TARGET may provide beacons at all of its retail stores. Each of these beacons would have the same source identifier string, so that a mobile app executing on a user's mobile device 6 will be able to feed the beacon ID signal to that TARGET app for processing. That is, the TARGET app will request the operating system 12 to hand off any beacon identifiers that arrive with the TARGET source identifier. This process is known in the art, but is modified by the present invention as will be discussed below.

The major location identifier is the second part of the beacon identifier, and is generally a two-byte string that may be used to indicate a general location of the beacon, such as a store address. Thus, each beacon located at a $5^{th}$ Avenue TARGET store in New York City would have an identical major location identifier (identifying the beacon as being located at that $5^{th}$ Avenue store), as well as the same source identifier. The minor location identifier is the third part of the beacon identifier, and is generally a two-byte string that may be used to indicate a specific location of the beacon, such as an entry door, a specific department location, a specific floor in the store, etc. Thus, by analyzing the beacon identifier, the operating system 12 can pass off the beacon identifier to the appropriate mobile app (as identified by the source identifier), which will then know at which retail location the user is located (as identified by the major location identifier) as well as the specific location at which the user is located or is approaching (as determined by the minor location identifier and the ranging calculations).

The prior art beacon systems function as had been described above, wherein a mobile app 18 is triggered by the receipt of a wireless beacon ID signal 5 that includes a beacon identifier associated with that mobile app. As discussed in the background, it has been recognized that as the use of these beacons proliferates, a mobile device may be bombarded with signals from many beacons at once in certain areas such as dense cities or even shopping malls. It is envisioned that this will become an untenable situation for a user in which uncontrolled notifications, messages, applications and the like are initiated by the multitude of beacons encountered by the user ant any given time. Thus, this first aspect of the invention solves this problem by giving the user complete control over the processing of the beacon ID signals in a way heretofore unavailable.

At the core of this first aspect of the invention is a beacon filter manager 14 that is running on the mobile device 6 as shown in FIG. 1. In the alternative, the functionality of the beacon filter manager 14 may take place on a computer over a network such as the internet 30 (also known as in the cloud). The beacon filter manager 14 also provides certain application post-processing functions that will be described in further detail below. The filter manager 14 may be a separate application executed when desired by a user, or it may be tightly integrated into the operating system platform 12 of the mobile device if desired by the system designer, or it may be provided on a server computer in the cloud 30. In any case, the functionality of the filter manager 14 will now be described with respect to the flowchart of FIG. 2.

As described above, at step 200 the mobile device 6 receives one or more wireless beacon ID signals 5 from beacons 4 that are strategically located throughout a premises such as a shopping mall. At step 202, the beacon identifier is decoded from the wireless beacon ID signal by the mobile device, and the beacon filter manager 14 intercepts the beacon identifier at step 204. The beacon filter manager 14 pre-processes the beacon identifier and initiates one or more actions at step 206 based on the beacon identifier, optionally in conjunction with a user profile 16 stored in memory on the mobile device 6 to provide actions that are tailored to the user of the device. Optionally, the user profile 16 may be stored on a computer in the cloud 30 rather than or in addition to being stored on the mobile device 6.

Figure 2:
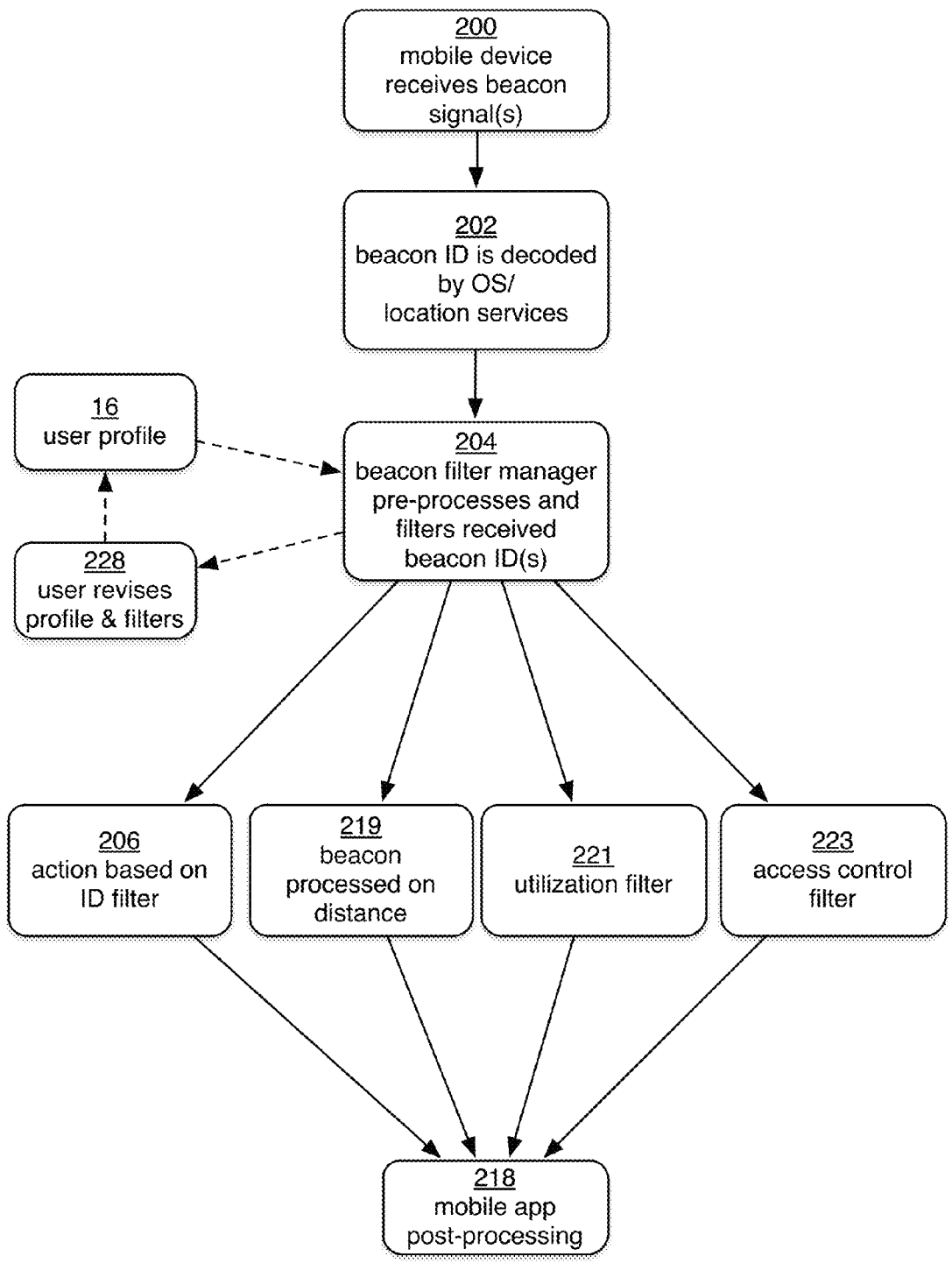
FIGS. 2, 2A and 2B provide a flowchart of the basic operation of the preferred embodiment of the first aspect of the present invention.
Figure 2A:
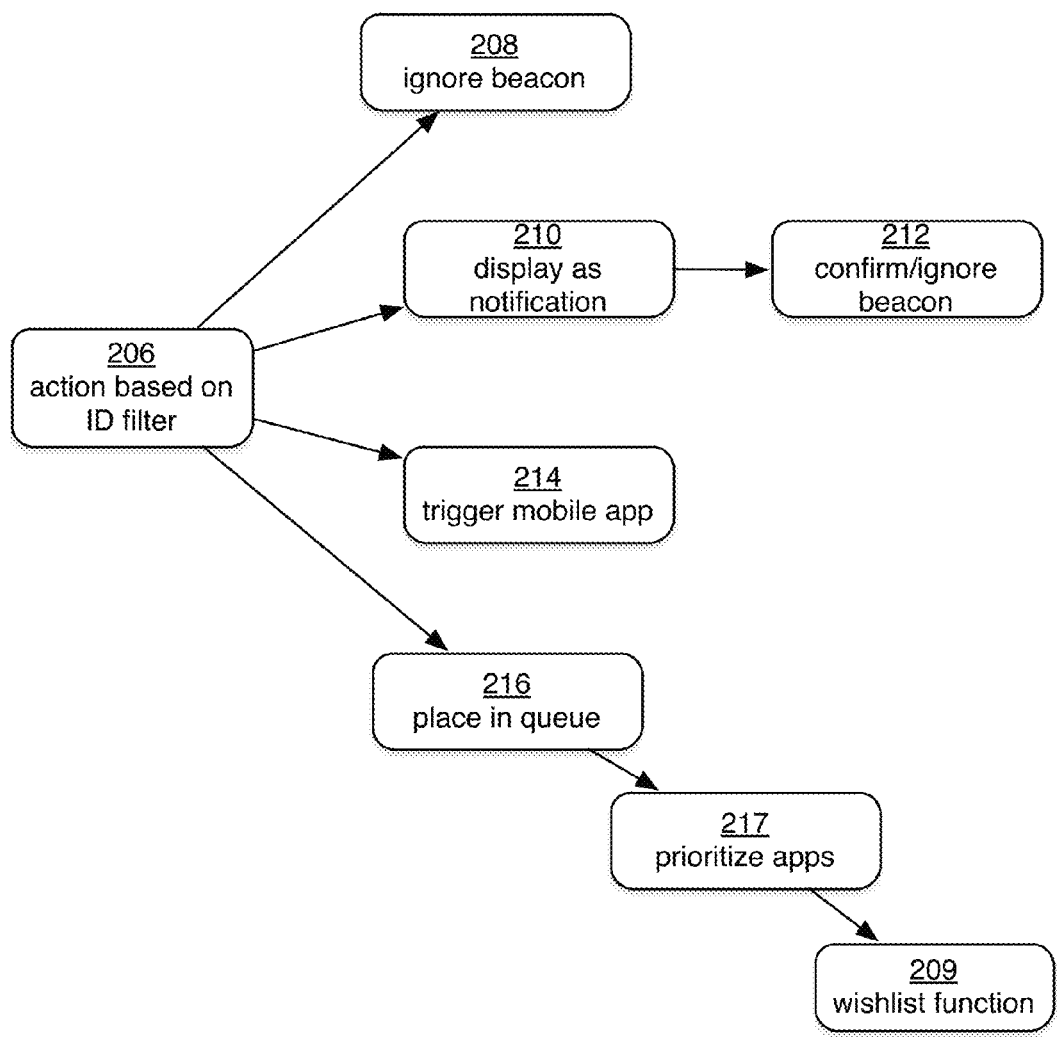

The various actions that may occur at step 206 are illustrated in FIG. 2A. One filter that may be applied to the beacon identifier is the IGNORE filter indicates that the beacon identifier should be ignored at step 208. This may be determined by reference to a no-action table of beacon identifiers established by the user in the user profile 16, such that if the beacon identifier matches the no-action table then the action initiated by the mobile device is simply to ignore the beacon identifier as if it had not been received. A beacon identifier may be ignored at all times (unless modified by the user at step 228), or it may be ignored at certain times of the day or days of the week, etc. For example, the user may specify a preference in the profile 16 that provides for ignoring beacon identifiers from any clothing shops, since he may not want to be bombarded with clothing offers as he travels through a shopping mall or on a city street. Or, he may want to filter out any beacon identifier from a food establishment such as a restaurant at times other than 6 PM through 8 PM. Or, he may want to filter all beacons on Sunday or any other day selected. In this case the user may be given complete control for filtering beacons to be ignored with the IGNORE filter by using a control panel or user dashboard 1102 (see FIG. 11) that may be accessible on the user input/output 10 of the mobile device, which may for example be a touchscreen display. Alternatively, in the case in which the user profile is stored in the cloud, then the user may also be able to access the control panel or user dashboard 1102 for viewing and/or modifying the profile parameters via any client computer that may be granted access to the profile in the cloud, such as a desktop computer, laptop computer, tablet and the like, via for example a web browser program.

Another type of action taken by the filter manager 14 may be the DISPLAY NOTIFICATION filter, which acts to display a notification to the user at step 210 on the mobile device 6 that the source identified by the beacon identifier is transmitting a beacon ID signal to the mobile device. For example, a popup notification may state "TARGET Stores is attempting to send you information". Optionally, the user may be given the ability at step 212 to confirm that the mobile app associated with that beacon source may be triggered (such that the app will take certain actions such as displaying purchase incentives etc.) or to indicate that the beacon should be ignored. Thus, the user may be provided with a confirmation window on the touchscreen display that states "Would you like to accept the TARGET beacon?" Then the user can check a "Yes" or "No" selection box, based on how the user wants to handle the TARGET beacon at that specific moment in time. By checking "Yes", the TARGET app would then be given access to the TARGET beacon identifier as in the prior art, and take actions such as displaying a coupon or other purchase incentive. By checking "No", the TARGET app would not be triggered, and the TARGET beacon identifier would be ignored as in step 208. As a result, the user is given the ability to filter out certain beacons in real time as desired.

Another type of action that may be initiated by the filter manager 14 is the EXECUTE filter, which is the automatic execution of a mobile application resident in memory of the mobile device as shown at step 214. That is, the user may initiate an override of any previously stored ignore commands in the no-action table, such that all beacon identifiers would be passed on by the filter manager 14 to the intended mobile app associated with the beacon identifier without any further interaction by the filter manager 14. This override may be removed or modified by the user at any time as desired by modifying the user profile 16 at step 228.

Another type of action that may be initiated is the QUEUE action at step 216, which provides for the placement of the beacon identification in a transaction queue for subsequent processing. In this scenario, a multitude of beacon ID signals are received by the user mobile device 6, such as in an area populated with many beacons, all vying for the user's attention. Rather than ignore these beacons, a priority of service scheme may be implemented at step 217 to handle these multiple wireless beacon ID signals that may be received at around the same time in quick succession. These messages may be placed in a transaction queue and subjected to prioritization as determined by the user in the user profile 16 or on-the-fly as they are being received. For example, the user may specify that a simple FIFO (first in first out) scheme be used to allow sequential processing in the order they are received. Or, the beacon identifier may be analyzed to determine if certain beacons are of immediate interest to the user and then given higher priority, such as if the user has configured the priority to process beacon ID signals associated with stores that sell electronic devices before any other type of beacon ID signal. This may of course be user-configurable wherein priority settings may be stored in the user profile 16 in the mobile device or alternatively in the cloud. The priority settings are also referred to as a WISHLIST feature 209, whereby the user may specify the beacons of most interest to him, so that the WISHLIST generated by the user is saved in the user profile for use in prioritizing and/or filtering desired beacons of interest. For example, a user may specify the following types of beacons on a WISHLIST:

1. Electronics
2. Fast food restaurants
3. Music stores

The priority scheme would then place beacons received from those types of establishments at the top of the queue so they are viewed by the user before any other beacon. This may also interoperate in conjunction with the IGNORE filter at step 208 such that beacons received from any type of establishment other than those in the WISHLIST 209 are ignored by the mobile device and not presented to the user. These options are all configurable in the user dashboard 1102 as described further below.

In addition to filtering the beacon signals as a function of the beacon ID, the beacon signals may also be filtered and processed as a function of the distance that the transmitting beacon is from the mobile device, as shown at step 219 in FIG. 2. As described above, the operating system and/or location services software 12 of the mobile device 6 is capable of measuring the RSSI of the wireless signal 5, and as a result is able to provide a ranging function that ascertains how far the device 6 is from the transmitting beacon 4. The beacon filter manager 14 may be programmed to block out beacon signals that are at a predetermined distance from the mobile device. For example, the user may specify in the user profile that any beacon signal received from a beacon that is measured to be more than X feet from the mobile device should be ignored. Or, the user may specify that any beacon signal received from a beacon that is measured to be less than Y feet from the mobile device should be given a high priority in the processing queue that was described above. Other distance parameters may be established as desired by the user. The distance filter may be used in conjunction with any or all of the beacon ID filters described above as may be desired in order to provide the user with fine granularity in managing the beacon signals that are received by his mobile device.

Another type of filter that may be implemented is a utilization filter 221, which may work in conjunction with the ID filters and/or the distance filters described above. The utilization filter 221 is based on keeping track of the number of beacon signals that are received from a certain source, or from a certain type of source, and limiting subsequent beacon signals from being processed if the number already received exceeds a predetermined threshold. For example, the sure might indicate in his user profile that he only wants to see twenty-five beacon signals from music stores in any given day, or he may indicate that he does not want to see more than ten beacon signals from fast food restaurants, etc. Or, he may indicate she only wants to see up to five beacon signals from MACYs stores, or up to ten beacon signals from TARGET stores, etc. In the alternative, utilization may be based on a monetary value. For example, he may indicate that he does not want to see any beacon signals having an incentive value less than five dollars. These parameters may be set by the user in his user profile and modified as desired. In addition to operating in conjunction with the beacon ID at step 206, the utilization filter 221 may work with the distance filters 219 as described above. For example, the user may specify that he would only like to receive five beacon signals per day from sources less than X feet away, etc.

Yet another type of filter that may be utilized is an access control filter as shown at step 223 in FIG. 2. The access control filter 223 implements an external qualifier in order to pass the beacons signal through to the associated app. For example, an external qualifier may be that a certain number of loyalty or reward points must be available in the user's reward account in order for the beacon signal to be utilized. In this example, the beacon may originate from a source that requires the user to be a user with 10,000 AMERICAN EXPRESS MEMBERSHIP REWARD POINTS, or that the set be MARRIOTT PLATINUM MEMBER, etc. This will enable filtering out of those users without the desired reward/loyalty status as may be desired.

Other types of filters and priority schemes may be utilized with this invention in order to carry out the preferences of the user, all of which could be modified by the user at any time via the user profile 16. A default set of filters may be preloaded into the profile in the event the user has not made any affirmative choices in this regard.

After the filter manager 14 has processed, filtered, prioritized, and otherwise managed the incoming beacon identifiers, they are passed on to associated mobile apps as described above. For example, a TARGET beacon identifier may indicate to the TARGET app that the user is standing at the electronics counter of the $5^{th}$ Avenue TARGET store in New York City, and display an offer to purchase an XBOX gaming system at that location for $200. While these notifications are intended to entice users to make purchases on the spot, it is desired to take one or more actions in conjunction with these mobile apps in order to provide an optimized user experience. Thus, in the present invention, post-processing of the actions taken by these mobile apps is undertaken in step 218 as will now be described in detail at FIG. 2B.

Figure 2B:
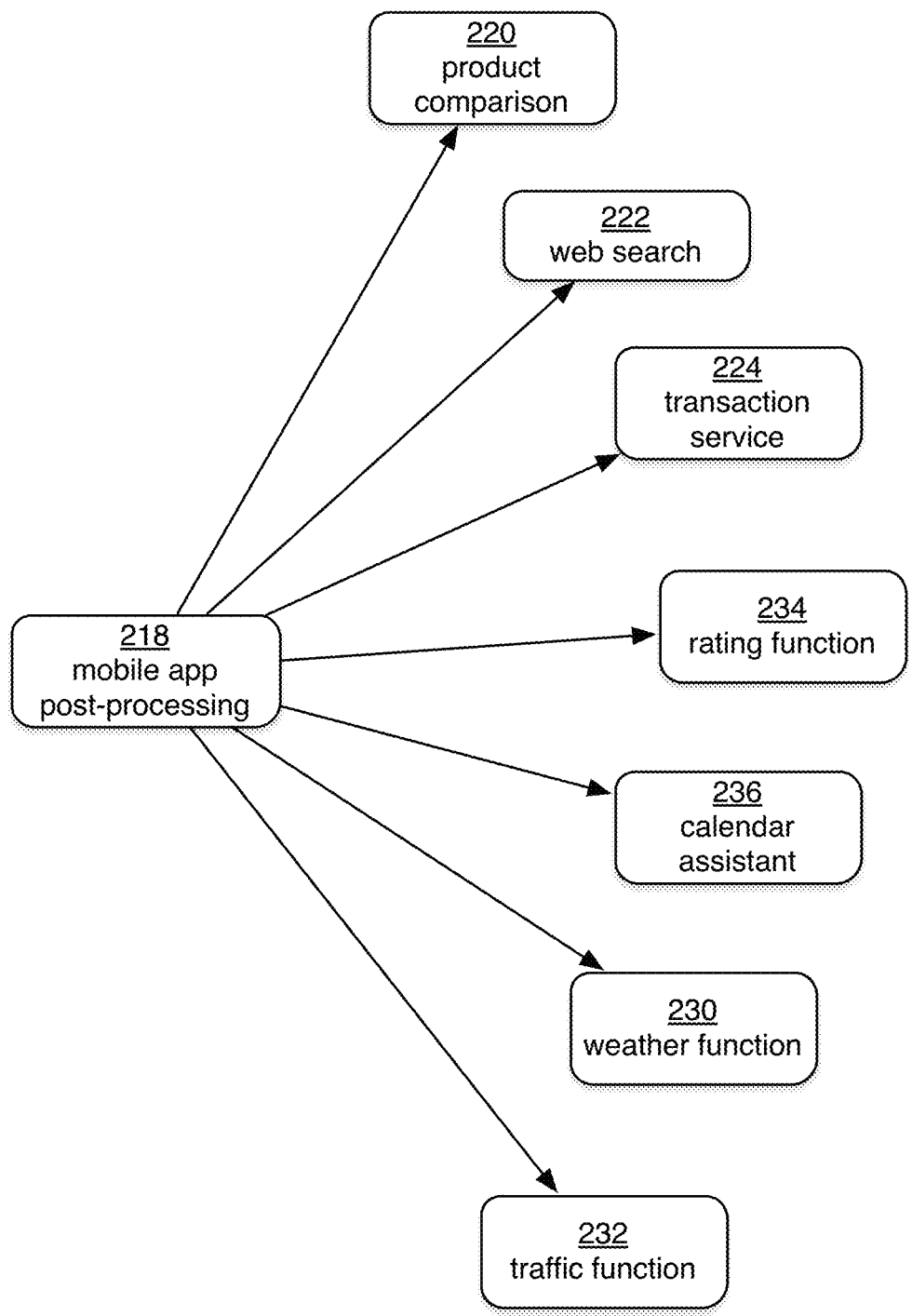
Figure 3:
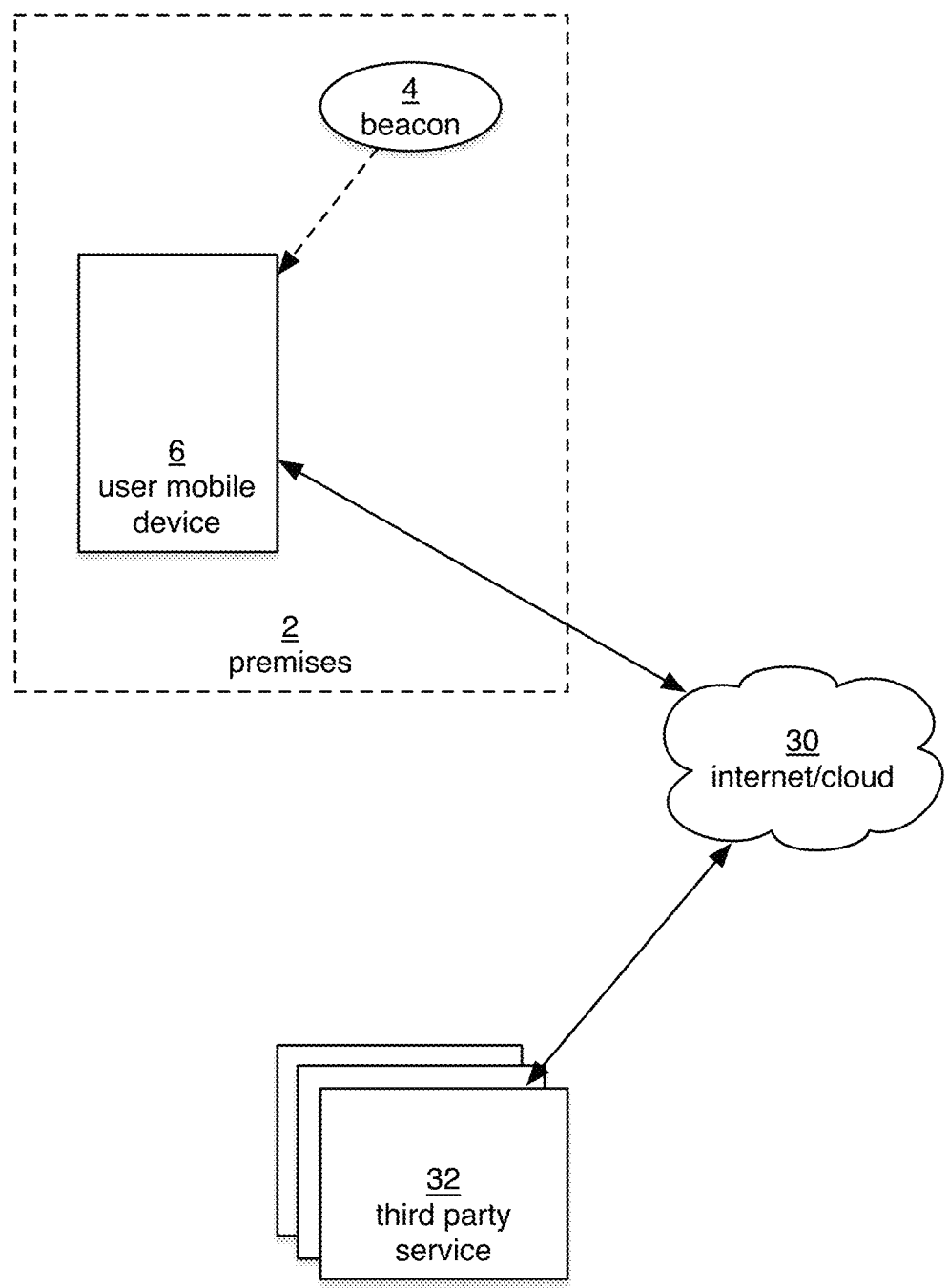
FIG. 3 is a block diagram of an alternative embodiment that uses a third party service.

One type of post-processing action is a product comparison step 220 as shown in FIG. 2B and with reference to FIG. 3. In this situation, the purchase offer made by the TARGET mobile app is post-processed by the mobile device 6 sending via the Internet 30 a request to an external third party service 32 for a product comparison service. Here, the mobile device 6 may be configured to request the third party service 32 to provide a product comparison report that may include prices at various merchants for a product that is being offered by the mobile app. That is, the product comparison service would return to the mobile device a list of alternative sources for the XBOX as well as the price terms from each source. As such, the user could make an easy and quick analysis of the $200 price being offered by TARGET to determine if that offer has value or not to the user. This would enable the user to quickly determine if the product offer is at a desired price, or if another merchant such as AMAZON may be selling the same product for a lower price.

Another type of post-processing action is the use of a web search service at step 222. In the case of a web search service, the mobile device 6 may be configured to request the web search service to execute a web search in real time regarding the subject matter of the data provided by the mobile app that was triggered by the beacon. For example, the triggered mobile app may provide information regarding a TARGET store that a user is entering; that information may be used to obtain a web search report via the web search action, which may have further information about the TARGET store. Similarly, if a user is entering a ballpark, the web search service could provide information from a web search regarding the ballpark, the teams that are playing there, etc.

Another type of post-processing action is the use of a transaction service at step 224. Here, the triggered mobile app may display a purchase incentive such as a product coupon, and the coupon may then be used to execute an online purchase of the product using an appropriate transaction service. For example, a manufacturer coupon from MICROSOFT may be displayed on the screen of the mobile device when the user is approaching the electronics department at TARGET. The user may be able to execute a post-processing transaction that uses that manufacturer coupon (since it is not specific to TARGET only) with AMAZON to purchase the XBOX from AMAZON rather than TARGET.

Yet another type of post-processing action is a feedback and rating function at step 234 that enables users to provide feedback in the form of ratings or grades based on their opinion of the functionality provided by any given beacon transaction. For example, a wireless beacon ID signal may be received from beacon located at a TARGET store, which after being processed by the mobile device will call a TARGET app executing on the mobile device and enable the TARGET app to display a purchase incentive to the user. In this example, the purchase incentive may be a $5 coupon for use in the food department of that TARGET store. At any point after the coupon is displayed to the user, the rating function 234 may generate a message for display to the user that invites the user to rate the beacon service just provided. The user may opt out (decline), or may agree to provide the rating/feedback as requested. By checking an appropriate box on the screen, the user may then enter any type of rating that may be allowed for by the system designer, such as a numerical rating (e.g. 1-10), a star rating (e.g. 1-5 stars), a selection of one or more predefined ratio terms (e.g. "Excellent", "Good", "Fair", "Poor", "Terrible"), or any other type of rating or feedback that may be desired. This information may be collected by the beacon filter manager 14 and/or the TARGET app itself, and eventually that information may be provided to the TARGET company for analysis and evaluation.

Yet another type of post-processing action is a calendar assistant function 236 that enables integration with a separate calendar application or database that exists on the mobile device. The calendar assistant function can access the user's calendar data and determine if the user has availability at a certain date and time. For example, a beacon signal may be received from a movie theater as the user passes by in a shopping mall. The beacon signal is processed along with an accompanying mobile app that would like to determine if the user is available to view a movie that evening. A calendar database/app on the user's mobile phone is accessed, and it is determined that the user is available from 6-10 PM that evening. A display is generated that reads:

"The movie "The Godfather" is playing from 6:30-9:30 PM at the Acme theater to your left. Would you like to attend with a $2 discount tonight?"

The user is able to enter his response and optionally allow the mobile app to make a calendar entry that puts the movie on his calendar. The app can interact with the calendar app in other ways, such as finding the next time the user is available that the movie is playing, etc.

Another type of post-processing action is a weather information function 230 that can interact with weather services via the Internet and use the weather information from those services to provide more intelligent and customized notifications and incentives to the user. For example, a beacon signal may be received from an outdoor amusement park as the user passes by. The beacon signal is processed along with an accompanying mobile app that would like to determine if the weather would be conducive for the user to use the outdoor facilities. The weather information is accessed from weather information source on the Internet (optionally in conjunction with an associated weather app on the mobile device), and it is determine that the weather is pleasant for the remainder of the day for outdoor activities. A display is generated that reads:

"The park "Rides 'n Games" is open on your left. The weather is sunny for the rest of the day and the park will be open until 10 PM. Here is a $10 discount coupon avid for the rest of the day".

Another type of post-processing actin is a traffic information function 232 that can interact with traffic services via the Internet and use the traffic information from those services to provide more intelligent and customized notifications and incentives to the user. The traffic information function operates similarly to the weather information function described above, except that traffic information is obtained and processed for the user along with the beacon signal rather than weather information.

User Dashboard

Figure 11:
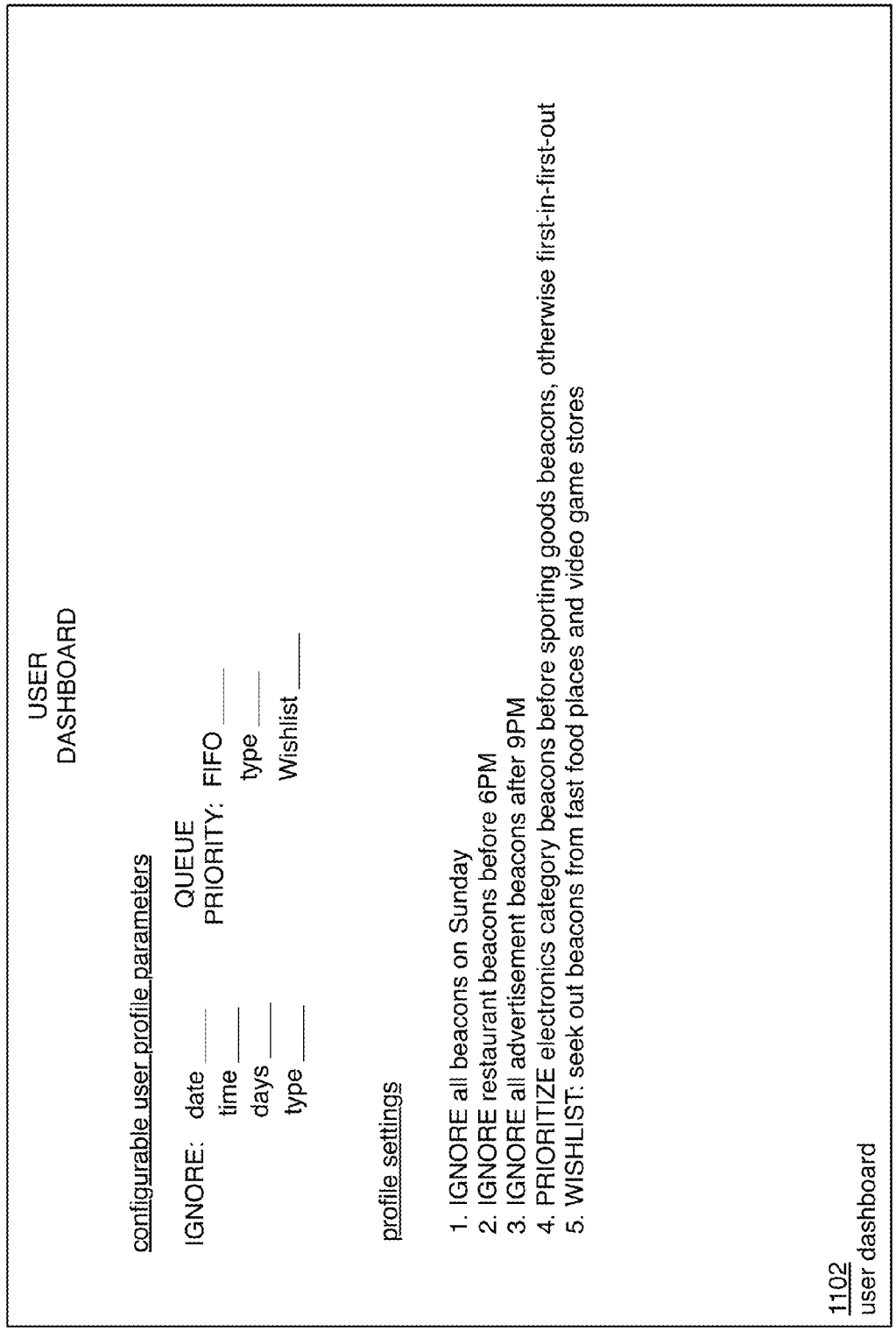
FIG. 11 is an illustration of a user dashboard control display that is used to control various parameters of the present invention.

FIG. 11 illustrates an exemplary display of a user dashboard 1102, which may be viewed on a web browser on a computer, mobile device, etc. In the case of a mobile device such as a smartphone or tablet, the user dashboard 1102 may be viewed and configured in the alternative using a dedicated app executing on the mobile device as know in the art. In either case, the user dashboard enables a user to view any or all of his user profile parameters and change them if desired. In the example shown in FIG. 11, the user is able to view his current profile settings. Here, the user has already entered settings so that all beacons are ignore don Sunday, restaurant beacons are ignored before 6 PM, and all beacons containing an advertisement beacon re ignored after 9 PM. This user has set a priority queue to process beacons in the electronics category before any beacons in the sporting goods category, and all other type sin a FIFO basis. Finally, this user has indicated in his WISHLIST that he would like to seek out beacons from fast food places (such as BURGER KING) and video game stores.

These user profile parameters may be modified in the section above that is labeled configurable user profile parameters. By selecting any of the parameters shown, he can change his profile settings. For example, he can select the IGNORE:type parameter and enter specific types or categories of beacons that he would like to IGNORE and not be bothered with. This can be combined with the IGNORE:time parameter for additional specificity. Thus, he is able to set the filter that will ignore restaurant beacons after 6 PM.

The user profile settings are stored on his mobile device for easy control and access, or in the alternative on a server computer located in the cloud.

Second Aspect of the Invention—Intelligent Beacon

In accordance with a second aspect of the invention, the wireless beacon contains intelligence, or is interconnected with a computer(s) that provides intelligence, such that the beacon transmits more than just a beacon identifier as in the first aspect of the invention discussed above. This may be a dedicated beacon or a mobile smartphone beacon as will be described.

A detailed description of the second aspect of the invention will now be provided. In this aspect of the invention, the beacon is referred to as being intelligent since it is capable of transmitting beacon content in addition to a beacon identifier. This aspect of the invention is discussed with reference to FIGS. 4 and 5 herein.

Figure 4:
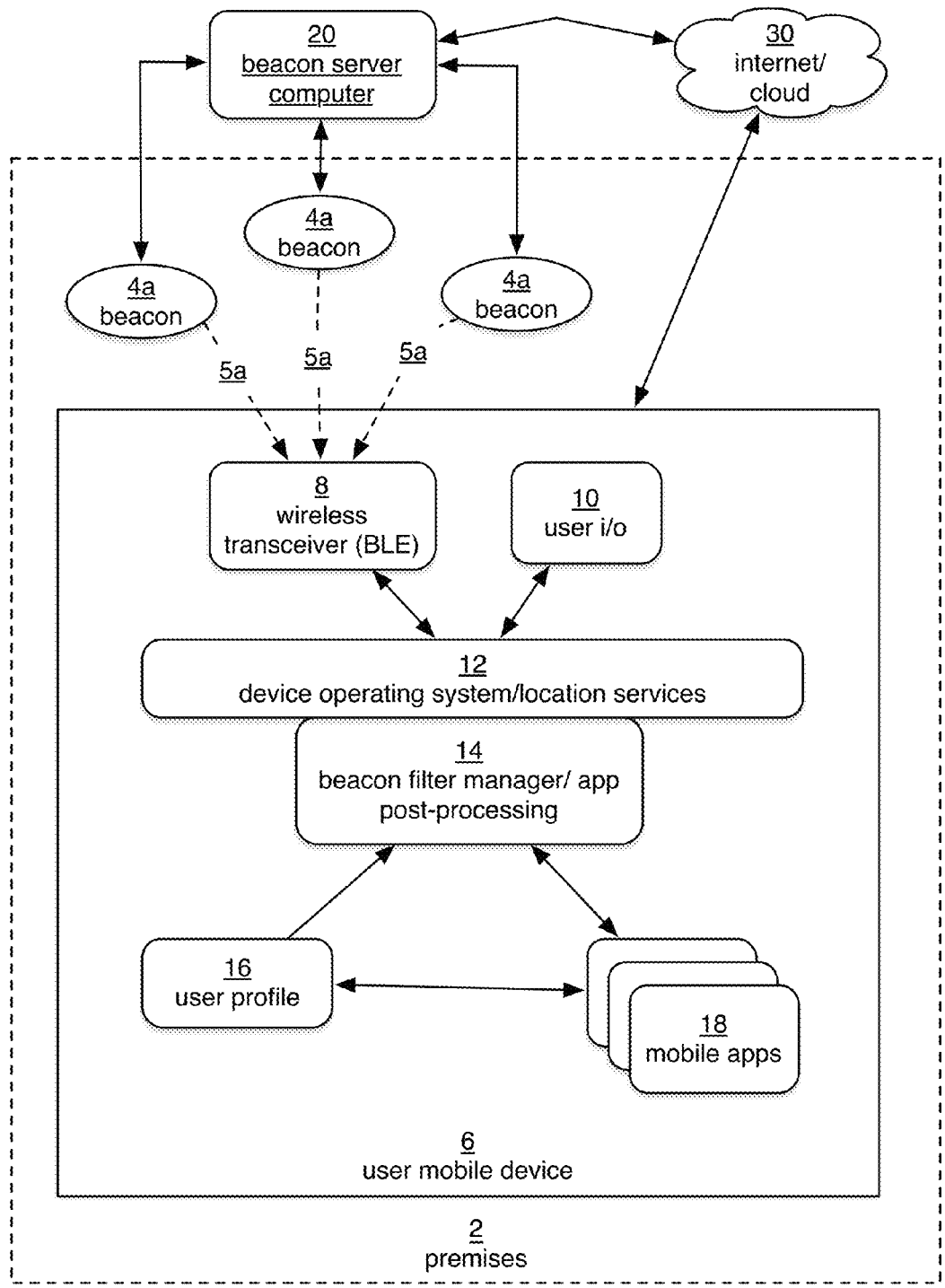
FIG. 4 is a system level block diagram of the preferred embodiment of the second aspect of the present invention.

FIG. 4 provides a basic block diagram of the system that implements an intelligent beacon 4a, i.e. a beacon capable of transmitting a wireless beacon data signal 5a that includes beacon content in addition to a beacon identifier (referred to herein as beacon data). These beacons 4a are similar to the beacons 4 described in the first aspect of the invention above, and may be easily deployed in a premises or other geocentric location 2 by an enterprise or any entity wanting to broadcast its identity as well as specific content to a user mobile device. The intelligent beacon 4a differs from the beacon 4 in that it includes processing circuitry and program storage that enable it to provide beacon content such as notifications, purchase incentives (I.e. coupons), and other information in addition to its beacon identifier as described above. Of course, in addition to being a dedicated beacon, the beacon here may be a mobile smartphone beacon appropriately configured. The content may be generated and stored on the beacon 4a itself. Or, the beacon may interconnect to a beacon server computer 20, which may be located on the premises 2 or offsite in the cloud 30 as desired. As such, an enterprise may program these beacons 4a to deliver content as may be desired. For example, the enterprise may program the beacons 4a to deliver $20 discount coupons for plasma TVS, or other type of beacon content, which may be changed by the enterprise when desired. In this aspect of the invention, the wireless beacon data signal 5a is demodulated and decoded by the mobile device to provide the beacon data; i.e. the beacon identifier (which may include some or all of the source identifier, major location identifier, and minor location identifier) and also the beacon content (e.g. a purchase incentive).

As described above, the mobile device 6 is capable of receiving the wireless beacon data signal 5a via the wireless Bluetooth transceiver 8 once it is with range of the beacon 4a, without the requirement of being previously paired with the beacon. The operating system and/or location services software 12 of the mobile device 6 is capable of measuring the RSSI (received signal strength indication) of the wireless beacon data signal 5a, and as a result is able to provide a ranging function that ascertains how far the device 6 is from the transmitting beacon 4a. By receiving signals from more than one beacon 4a, the ranging accuracy is improved and the device 6 can more accurately determine its relative position with respect to the beacons 4a. Ranging calculations are known in the art and need not be repeated here.

The mobile device processes the wireless beacon data signal 5a from the beacon 4a and then decodes the signal to determine the beacon data (the beacon identifier and the beacon content). The beacon identifier may be in the same format as described above in the first aspect of the invention. The beacon content may be any content that may for example be displayed on the screen of the device such as a coupon (or which causes an action to take place on the device).

As discussed in the background, it has been recognized that as the user of these beacons proliferates, a mobile device may be bombarded with signals from many beacons at once in certain areas such as dense cities or even shopping malls. It is envisioned that this will become an untenable situation for a user in which uncontrolled notifications, messages, incentives, applications and the like are initiated by the multitude of beacons encountered by the user ant any given time. Thus, this second aspect of the invention solves this problem by giving the user complete or partial control over the processing of the beacon signals in a way heretofore unavailable.

At the core of this second aspect of the invention is the beacon filter manager 14 that is running on the mobile device 6 (or in the cloud 30) as shown in FIG. 4. The beacon filter manager 14 also provides certain application post-processing functions that will be described in further detail below. The filter manager 14 may be a separate application executed when desired by a user, or it may be tightly integrated into the operating system platform 12 of the mobile device if desired by the system designer, or it may be executed on a remote computer over the internet (in the cloud 30). In any case, the functionality of the filter manager 14 will now be described with respect to the flowchart of FIG. 5.

As described above, at step 500 the mobile device 6 receives one or more wireless beacon data signals 5a from beacons 4a that are strategically located throughout a premises such as a shopping mall. At steps 502 and 503, the beacon identifier and beacon content are both decoded from the wireless beacon data signal by the mobile device, and the beacon filter manager 14 receives the beacon identifier and beacon content at step 504.

It is noted that there may not be a need for a mobile app to be executed in association with the beacon ID as in the first aspect of the invention discussed above that utilizes only the beacon ID and has no beacon content. Since the mobile device in this first aspect receives only the beacon ID from a dumb beacon 4, there is a need for an associated mobile app to handle the receipt of that beacon ID and provide the desired content to the user in the form of a purchase incentive, notification and the like, as known in the art (and as operated on by the beacon filter manager as discussed above). However, in this second aspect of the invention, there will be some sort of beacon content made available directly from the intelligent beacon 4a, which may obviate the need for the associated mobile app on the mobile device. For example, the beacon content may be a simple purchase incentive that may be displayed on the screen of the device without the need for any interaction by a mobile app on the device. In some cases however, as described further below, a mobile app may interact with the received beacon content, such as if a purchase incentive template is received by the mobile device and an associated app is executed that modifies the purchase incentive template to the particular user (e.g. user A gets a $50 coupon and user B gets a $60 coupon off of the same template received from the beacon).

At step 504, the beacon filter manager 14 analyzes the beacon data (the beacon identifier and/or beacon content) and initiates one or more actions at step 506 based on the beacon data, optionally in conjunction with a user profile 16 stored in memory on the mobile device 6 or in the cloud 30 to provide actions that are tailored to the user of the device. Optionally, the beacon content may include a template that requires customization by the mobile device before continuing to process it. If at step 504 it is determined that the content includes a template, then the processing branches to the loop at step 505 to customize the template as will be described further below. Assuming that the beacon content does not include a template and is otherwise complete, then the filter manager continues to process the beacon content at step 506.

One filter that may be applied to the beacon data indicates that the beacon data should be ignored at step 508. This may be determined by reference to a no-action table of beacon data established by the user in the user profile 16, such that if any of the beacon data matches the no-action table then the action initiated by the mobile device is simply to ignore the beacon data as if it had not been received. Beacon data may be ignored at all times (unless modified by the user at step 528), or it may be ignored at certain times of the day or days of the week, etc. For example, the user may specify a preference in the profile 16 that provides for ignoring beacon data from any clothing shops, since he may not want to be bombarded with clothing offers as he travels through a shopping mall or on a city street. Or, he may want to filter out any beacon data from a food establishment such as a restaurant at times other than 6 PM through 8 PM. Or, he may want to filter all beacons on Sunday or any other day selected. In this case the user may be given complete control for filtering beacons to be ignored with a control panel or dashboard 1102 (see FIG. 11) that may be accessible on the user input/output 10 of the mobile device, which may for example be a touchscreen display. Alternatively, in the case in which the user profile is stored in the cloud, then the user may also be able to access the control panel or dashboard 1102 for viewing and/or modifying the profile parameters via any client computer that may be granted access to the profile in the cloud, such as a desktop computer, laptop computer, tablet and the like.

The beacon data may be ignored as a function of the beacon identifier as described with respect to the first aspect of the invention above. Or, if desired, the beacon data may be ignored as a function of the beacon content within the beacon data. For example, the beacon data may include a coupon for pet food that is broadcast to all users within the vicinity of the beacon 4a. The no-action table may indicate a rule that states that any beacon content received that relates to pets will be ignored and not displayed to the user. In this case, the mobile device need not be aware of the identification of the beacon as coming from a pet store, but can analyze the content of the beacon signal itself to ascertain that it relates to pets, and that the user has instructed the device to ignore any content relating to pets. This would be particularly useful to filter out pet related content coming from a store not otherwise identified as a pet store, such as a supermarket.

Another type of action taken by the filter manager 14 may be to display a notification to the user at step 510 on the mobile device 6 of the source of the beacon data being transmitted to the mobile device. For example, a popup notification may state "TARGET Stores is attempting to send you pet-related information". Optionally, the user may be given the ability at step 512 to confirm that the beacon content should be displayed directly on the device without needing to invoke a mobile app, or that a mobile app associated with that beacon source may be triggered (such that the app will take certain actions such as displaying purchase incentives etc.), or to indicate that the beacon should be ignored. Thus, the user may be provided with a confirmation window on the touchscreen display that states "Would you like to accept the TARGET beacon?" Then the user can check a "Yes" or "No" selection box, based on how the user wants to handle the TARGET beacon at that specific moment in time. By checking "Yes", the TARGET beacon content received from the beacon 4a would then be displayed on the screen, or an app would then be given access to the TARGET beacon data as in the prior art, and take actions such as displaying a coupon or other purchase incentive. By checking "No", the TARGET beacon data would be ignored as in step 208. As a result, the user is given the ability to filter out certain beacons in real time as desired.

Another type of action that may be initiated by the filter manager 14 is the automatic execution of a mobile application resident in memory of the mobile device as shown at step 514. That is, the user may initiate an override of any previously stored ignore commands in the no-action table, such that all beacon data would be passed on by the filter manager 14 to an intended mobile app associated with the beacon content without any further interaction by the filter manager 14. This override may be removed or modified by the user at any time as desired by modifying the user profile at step 526.

Another type of action that may be initiated at step 516 is the placement of the beacon content in a transaction queue for subsequent processing. In this scenario, a multitude of beacon signals are received by the user mobile device 6, such as in an area populated with many beacons, all vying for the user's attention. Rather than ignore these beacons, a priority of service scheme may be implemented at step 517 to handle these multiple wireless beacon signals that may be received at around the same time in quick succession. These messages may be placed in a transaction queue and subjected to prioritization as determined by the user in the user profile 16 or on-the-fly as they are being received. For example, the user may specify that a simple FIFO (first in first out) scheme be used to allow sequential processing in the order they are received. Or, the beacon content (and/or identifier) may be analyzed to determine if certain beacons are of immediate interest to the user and then given higher priority, such as if the user has configured the priority to process beacon content related to electronic devices before any other type of beacon signal. This may of course be user-configurable wherein priority settings may be stored in the user profile 526 in the mobile device or alternatively in the cloud.

Other types of filters and priority schemes may be utilized with this invention in order to carry out the preferences of the user, all of which could be modified by the user at any time via the user profile 526. A default set of filters may be preloaded into the profile in the event the user has made any affirmative choices in this regard.

Similar to the first aspect of the invention described above in which an item such as a purchase offer generated by a mobile app associated with an incoming beacon identifier may be post-processed in one or more various manners (e.g. such as by a product comparison service), this second aspect of the invention provides for similar post-processing events to occur with respect to beacon content received directly from a beacon 4a at step 518.

Figure 5:
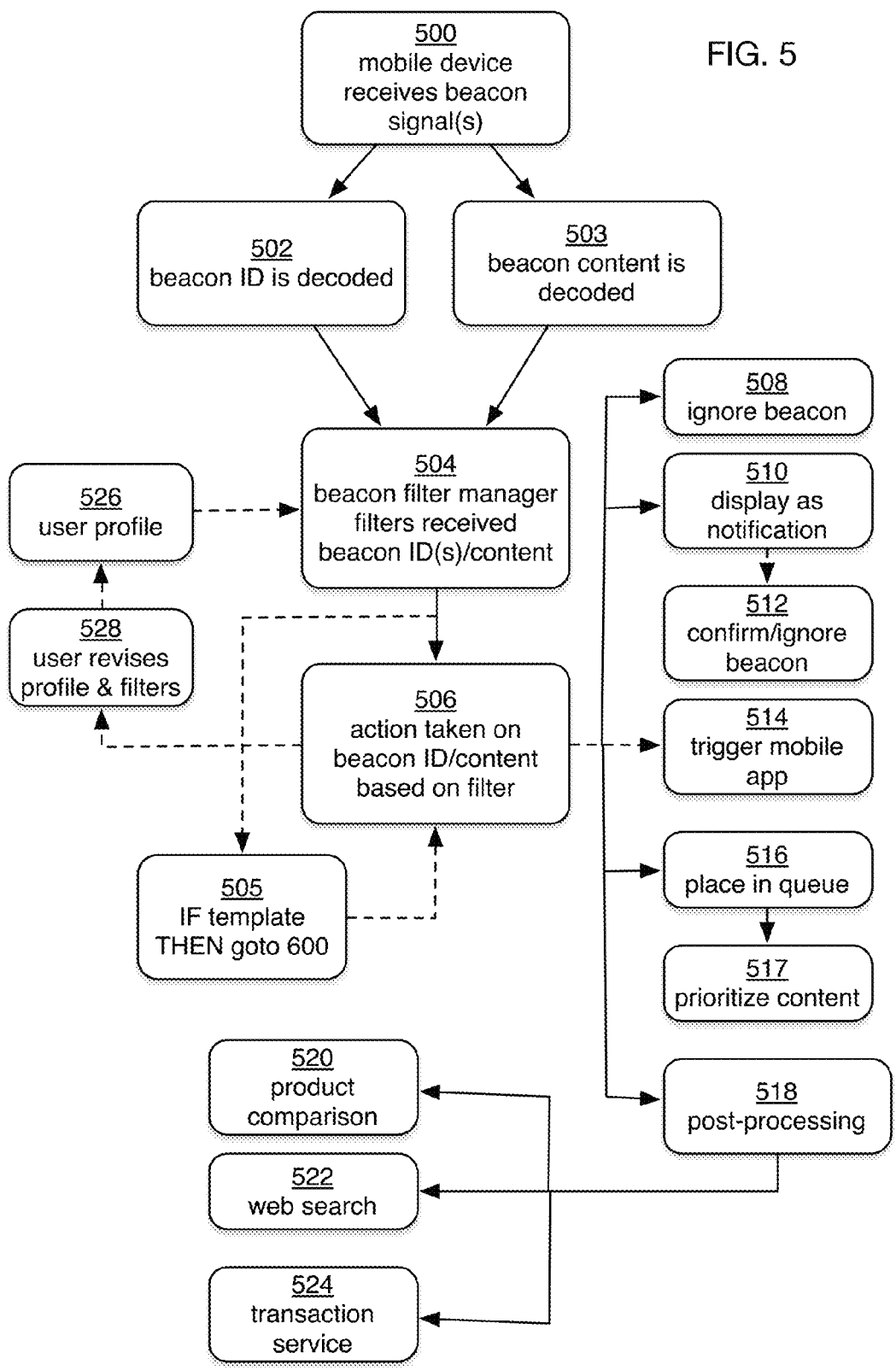
FIG. 5 is a flowchart of the basic operation of the preferred embodiment of the second aspect of the present invention.

One type of post-processing action is a product comparison step 520 as shown in FIG. 5 and with reference to FIG. 3. In this situation, the purchase offer made by the TARGET beacon 4a is post-processed by the mobile device 6 sending via the Internet 30 a request to an external third party service 32 for a product comparison service. Here, the mobile device 6 may be configured to request the third party service 32 to provide a product comparison report which may include prices at various merchants for a product that is being offered by the beacon 4a. Take for example the case in which a beacon 4a located at a TARGET store sends in its beacon content a purchase incentive in the form of a coupon that gives the user a sale price for an XBOX for $200. In this case, the mobile device at step 520 sends a request to the product comparison service to provide pricing and other terms for the same XBOX from alternative vendors such as AMAZON. The product comparison service would return to the mobile device a list of alternative sources for the XBOX as well as the price terms from each source. As such, the user could make an easy and quick analysis of the $200 price being offered by the TARGET beacon to determine if that offer has value or not to the user. This would enable the user to quickly determine if the product offer is at a desired price, or if another merchant such as AMAZON may be selling the same product for a lower price.

Another type of post-processing action is the use of a web search service at step 522. In the case of a web search service, the mobile device 6 may be configured to request the web search service to execute a web search in real time regarding the subject matter of the beacon content provided by the beacon 4a. For example, the beacon 4a may provide information regarding a TARGET store that a user is entering; that information may be used to obtain a web search report via the web search action, which may have further information about the TARGET store. Similarly, if a user is entering a ballpark, the web search service could provide information from a web search regarding the ballpark, the teams that are playing there, etc.

Another type of post-processing action is the use of a transaction service at step 524. Here, the beacon 4a may include win its transmitted beacon content a purchase incentive such as a product coupon, and the coupon may then be used to execute an online purchase of the product using an appropriate transaction service. For example, a manufacturer coupon from MICROSOFT delivered by the TARGET beacon may be displayed on the screen of the mobile device when the user is approaching the electronics department at TARGET. The user may be able to execute a post-processing transaction that uses that manufacturer coupon (since it is not specific to TARGET only) with AMAZON to purchase the XBOX from AMAZON rather than TARGET.

As described above, the beacon content such as a product coupon may be generated by either the beacon 4a, or by a beacon server computer 20 that interoperates with the beacons 4a. In the simple case of an enterprise needing only a few beacons, the beacon 4a may include input and output that enables a programmer to program the beacon content directly into the beacon, which would then transmit that content as instructed. In another embodiment, by using a central beacon server computer, an enterprise can readily control the operation and data content provided by a multitude of beacons that are interconnected to the server computer 20. This may be done locally at the premises or in a remote location via a WAN such as the Internet. In the case of a large enterprise with multiple retail locations, such as TARGET, the use of a centrally located beacon server computer 20 is advantageous. A programmer could implement a dashboard 1102 or other control panel that instructs particular beacons 4a to deliver the desire beacon content, which may be tailored specifically in different regions and in different stores, which may be changed at any desired time based on product supply and demand or other market conditions, etc. In one embodiment, the same beacon content would be broadcast to all listening mobile devices by a beacon so that any user that receives the wireless beacon data signal 5a would also be provided with the same content; e.g. the same coupon for the same products. Of course, this may be acted on in each individual user mobile device by the filter manager 14 as described above, so the resulting action on each mobile device may be different.

Figure 6:
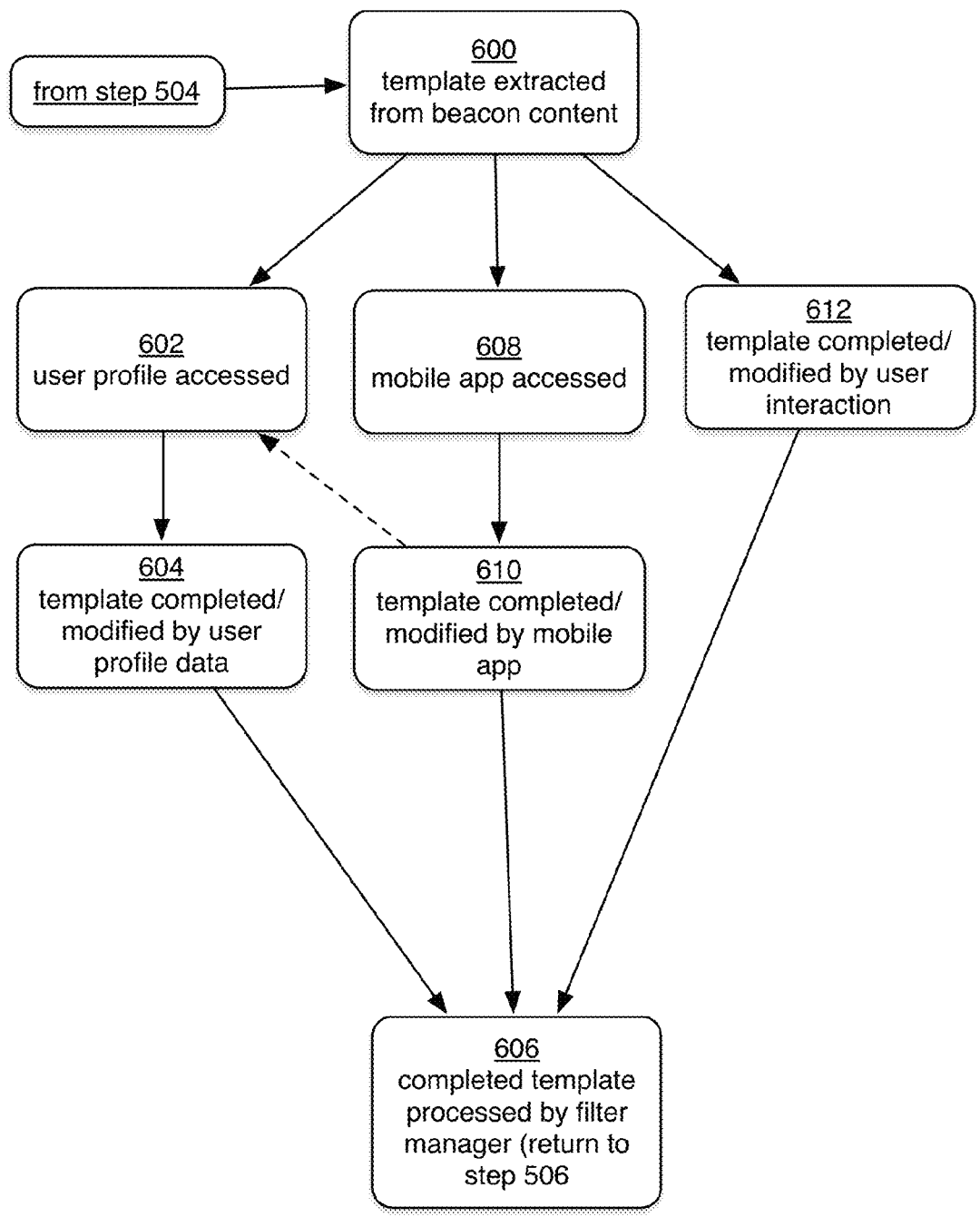
FIG. 6 is a flowchart of the operation of the template-based embodiment of this invention.

In an alternative embodiment, the beacon content may be in the form of a template such that each mobile device would take steps to complete or modify the template to present a message customized to the user of the mobile device. As explained above, at step 504, the beacon filter manager 14 determines if the beacon content may include a template that requires customization by the mobile device before continuing to process it. If at step 504 it is determined that the content includes a template, then the processing branches to the loop at step 505 to customize the template. This flows to step 600 in FIG. 6. As shown in FIG. 6, the template is extracted/decoded from the beacon content at step 600. On of three processing paths may then occur, based on what is required by the template. In the first path, at step 602, the user profile is accessed, and information from that user profile is used to complete or modify the template at step 604. At step 606, the completed template is passed back to the filter manager for processing at step 506 as discussed above. For example, in this case the template is a coupon to purchase an XBOX with a discount of either 10% if the user is an adult or 20% if the user is a teenager. By accessing the user profile, it may be determined in which demographic the user is, and the applicable discount may then be tailored to that user accordingly.

Alternatively, in the second path, a mobile app is accessed that is associated with the beacon identifier received and decoded by the mobile device in the wireless beacon data signal 5a. At step 610 the template is completed or modified by the mobile app, and then at step 610, the completed template is passed back to the filter manager for processing at step 506 as discussed above. Optionally, the mobile app may also require information from the user profile at step 602 to complete the template. Finally, in the third path, the template may be modified by interaction with the user at step 612 and then passed back to the filter manager for processing at step 506 as discussed above.

In an optional embodiment, the beacon 4a may have the ability to receive data messages from a user mobile device as well as transmit the wireless beacon data signals 5a as described above. In this manner, the beacon could request information from the user mobile device, which could respond based on information in the user profile or based on real-time interaction with the user. Additionally, the mobile device may be programmed to transmit periodic queries that search for beacons having certain characteristics. In this case, the user may be seeking to obtain purchase coupons for a desire product, and may set a mobile app on his device to transmit beacon search requests that would be received by beacons within range. If a particular beacon is able to provide the requested content, then it would respond to the querying mobile device accordingly.

Third Aspect of the Invention—Mobile Smartphone Beacon

In a third aspect of the invention, the beacon is a mobile smartphone beacon that has processing, wireless communications, and user input means as well known in the art. A mobile smartphone such as an IPHONE that executes the IOS 7 operating system may be programmed to operate as a beacon as well known in the art. In this aspect of the invention, multiple users carry their mobile smartphone beacon 6a as they travel around. The beacon 6a may be configured to periodically transmit beacon signals 700 as the user moves about (or remains stationary). Other mobile smartphone beacons 6a may receive these beacon signals 700 and process them as will be described herein. As they process these signals, they may elect to interoperate with the other beacons using methodologies and processes as now described.

One application of the use of the mobile smartphone beacon 6a is to enable parties to communicate with each other, i.e. in the field of social interaction for business or personal purposes. A mobile smartphone beacon may be programmed with an app that enables broadcast communications with a number of other users that may be executing the same app. This broadcast app enables a user to set certain parameters in a profile that is stored with the app. The profile may be established by the user entering data, and/or by the app referring to external databases to obtain information about the user, and/or by the app logging certain activities of the user and using logic such as artificial intelligence to analyze the activities monitored. For example, the user may enter basic data such as the user's name, geographic location including optionally his or her address, contact information such as an email address or the like, preferences such as desired activities (e.g. sports and music), demographic information such as income (e.g. $150,000 per year), gender, race, sexual preference, age, hobbies, interests, and the like. The app may then refer to external databases such as a social network web site such as FACEBOOK, TWITTER, PINTEREST, etc. to obtain further information about that user. By observing certain activities of the user with respect to the smartphone, such as logging using the GPS features where and when the user likes to travel, or observing shopping patterns, the app can make further determinations with respect to the user. All of this information may be stored in the user's profile associated with the app. The user may be required to give permission (i.e. opt in or out) to the app to generate and/or use certain portions of the profile. A dashboard page may be accessible to the user to enter, view, modify, or delete any or all parts of the user profile if desired. As previously described, the profile may be stored locally on the mobile device or in the alternative remotely on a server computer in the cloud.

Figure 7:
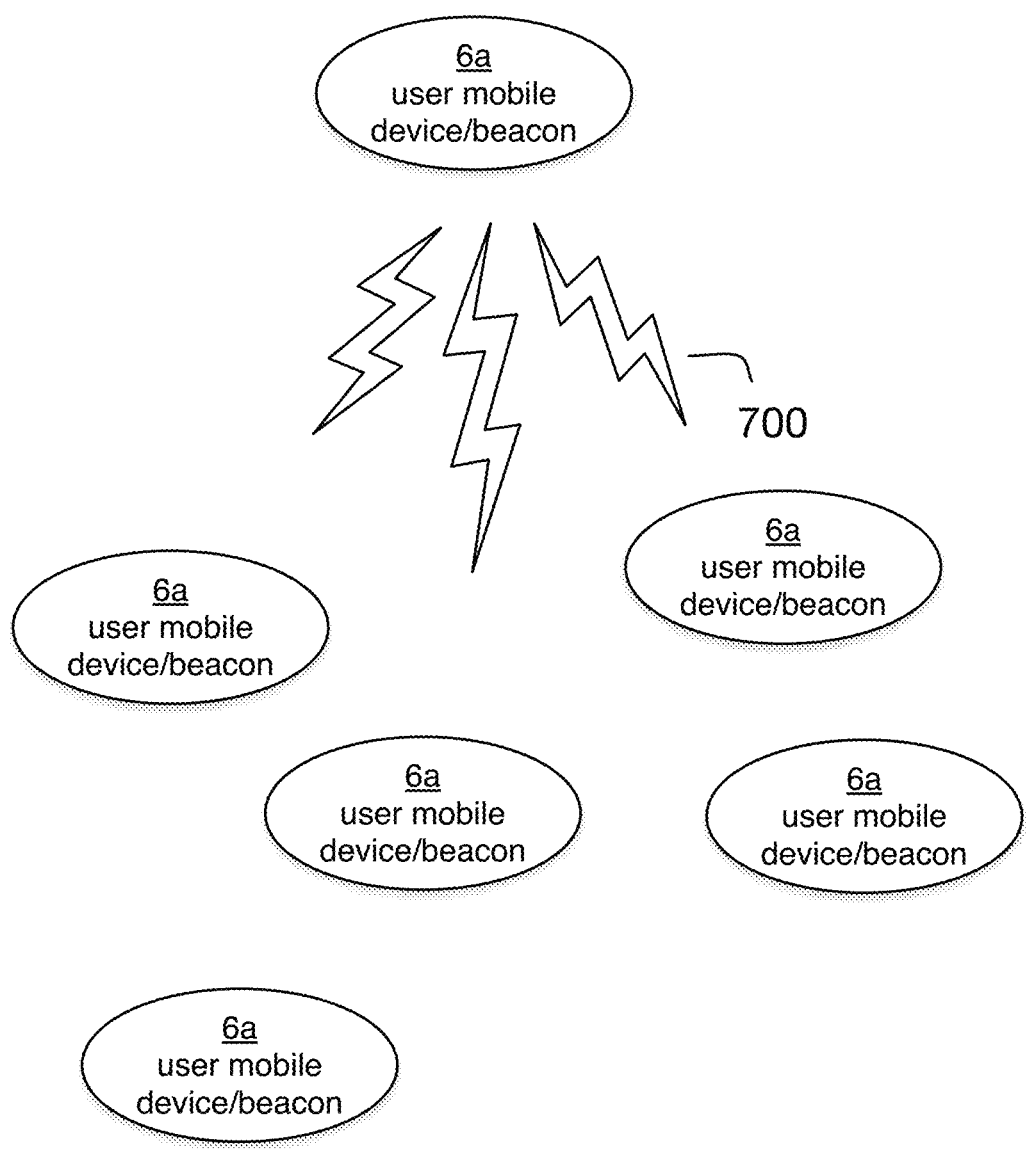
FIG. 7 is a system level diagram of the preferred embodiment of the third aspect of the present invention.
Figure 8:
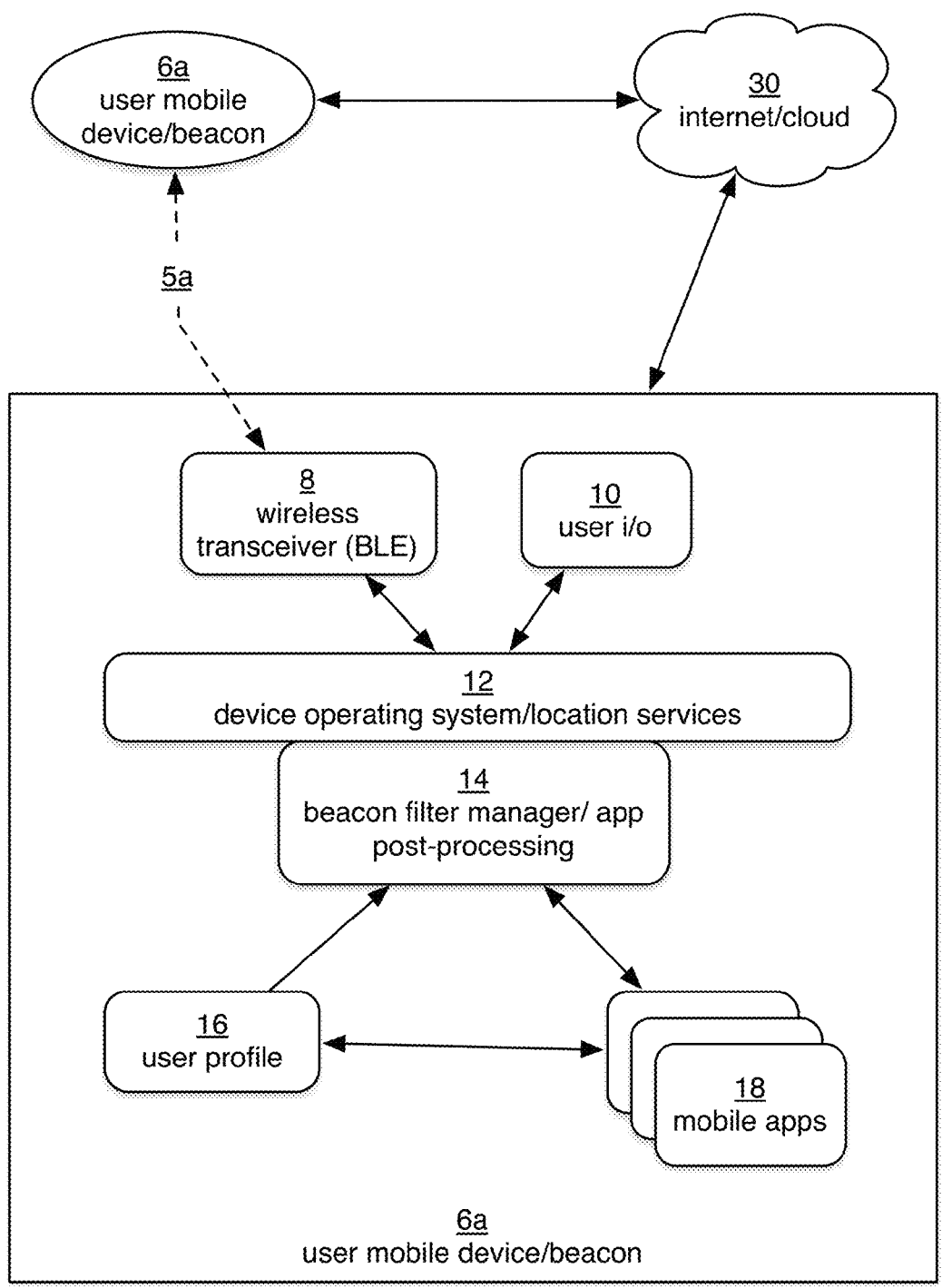
FIG. 8 is a more detailed diagram of the preferred embodiment of the third aspect of the present invention.

In a first embodiment, the app will broadcast certain information about the user as obtained from the profile. For example, the app may broadcast that the user is a single 40-year old male who likes hockey and football, as well as music and literature, and who makes between $100K-$200K per year. This information, along with an anonymous transmitter identifier, will be coded into a signal to be transmitted by the app via the beacon transmission protocol, which is known in the art. The beacon signal 700 will be broadcast by the mobile smartphone 6a as shown in FIG. 7, so that other mobile smartphones 6a in range of the broadcast signal will receive and process the signal. In one embodiment, the receiving smartphone(s) will have the same app as used by the broadcasting smartphone or a companion app that is compatible with the broadcasting app. Those users would have their apps set to a listen mode (which may be done manually automatically or by default), so that they can receive and process broadcast signals as they also travel about.

In this example, one of these smartphones that is executing the required app will receive the beacon signal broadcast by the transmitting device, and then be able to process the signal it has received. The receiving app will analyze the received data regarding the broadcasting user with respect to a user profile stored locally or remotely in association with the receiving app. This receiving user profile may contain preferences set by the user with user input, or in combination with intelligence provided by the app, which provides a framework for the analysis. The receiving user profile may specify what types of persons that the recipient is willing to engage with. For example, the receiving user profile may specify that the recipient is willing to engage with males with an interest in music who earn between $100K-$200K per year. This matches the profile data that was transmitted by the transmitting beacon smartphone. Thus, a positive match will be flagged for this received data. In another example, the recipient may state that she is not interested in anyone who likes sports, in this case there would be a negative match since the broadcasting beacon has indicated an interest in sports as well as literature.

In the event there is a positive match, one of several actions may be taken. In one example, a notification may pop up on the screen of the recipient's smartphone (or an audible tone) that alerts her to the fact that a positive match has been detected for some broadcasting a beacon signal in the area. The matching information may also be displayed so the recipient user can more easily analyze the data. If the recipient user would like to proceed based on the matching data, then she can trigger the next action which may be to send out a beacon signal that contains the transmitting identifier received from the transmitting beacon device, as well as profile data from the recipient's user profile that would be useful in making a further assessment by the initial transmitting user. Also included in the beacon signal is a recipient identifier that identifies the user who has received the initial beacon signal, analyzed it, and decided to return a signal to indicate a potential interest in the transmitting user.

The initial transmitting device will receive the beacon signal and analyze the signal, detecting the initial transmitting identifier as well as the recipient's identifier. Now that both devices have the identifier of the other device, they are able to negotiate and communicate with each other in this broadcast mode yet be able to discern those communications as being responsive to each other. As such, the apps on each device are able to analyze the data received from the other device with respect to the user's profile on their own device, and make intelligent decisions as to whether the other party is one which they would like to further engage. This may be done on an automatic basis, or there may be manual assistance by interacting with the user of the device. For example, a notification may be displayed to a user: "We are in contact with a 40 year old female who likes music and hockey, and who is employed by a law firm in NY. Shall we continue to communicate with her or cease further communications?" As such, each party can continue this beacon-based interaction or terminate it, as desired. This may lead to an exchange of contact information (email or phone number), names, etc. Or, a meeting could be set up via this protocol, for example "A meeting is schedule for 5:00 PM today at Joe's Bar on $5^{th}$ Avenue—Confirmed?" That can be confirmed, edited, denied, etc. This process enables users to exchange information on an automatic, semi-automatic, and/or manual basis as they travel throughout an area. This will help persons find other persons with desired interests and traits that would otherwise be unattainable. In addition to the personal information interchange described above, this may also apply to professional situations, for example for people seeking out certain types of other people at professional events such as trade shows and the like.

This process works well for enabling a user to filter and analyze a number of responses to an initial beacon signal. For example, a user may transmit a beacon signal with his information that may be replied to be a large number of recipients. In this one-to-many scenario, the user may then select those profiles that are most desirable, which may be done automatically or with assistance of the user. The number of recipients may be further and further reduced with additional exchange and queries, until the desired match is found and acted on.

In this aspect of the invention, the mobile smartphone beacon may operate in a search mode or a seek mode. In the search mode, the user configures the smartphone beacon to look for something specific, and the user will provide search parameters that help the beacon accomplish the search requirements. For example, the user may configure the search mode to find a single unattached Caucasian female around 25 years old, with blonde hair and a height in the range of 5'7" to 5'10", having an income over $100K per year, with an education of 4-year college or higher. The search app will use these search terms to filter out and negotiate with potential recipients in a very granular fashion, as described above. In the seek mode, there are no requirements provided, and the user is able to see what types of communication recipients may be available regardless of any predefined search parameters (also referred to as an open search).

This invention may act as an advertising or billboard service by enabling users to broadcast certain information via the beacon system. Potential recipients may receive the beacon signals and act accordingly. For example, the owner of a mobile pet grooming service may drive around with an intelligent beacon that broadcasts the availability of its pet grooming services using the technologies described above. Interested recipients may get the service notifications on their device screens and continue a dialogue that could, for example, set up an appointment for grooming services for their pet at a mutually convenient time, wherein a calendar application executing on the user's mobile device is accessed to assist in scheduling a grooming appointment. These terms and others may be negotiated between the devices in a manual, automatic, or semi-automatic manner.

As beacons interact with each other and exchange information as described above, certain assumptions may be made using a fuzzy logic or artificial intelligence component. For example, when two intelligent beacons exchange information regarding a search being made by one of the beacons, and the searching beacon continues to refine its search parameters by rejecting potential communications in the process, then the receiving beacon can log that information and make intelligent decisions at subsequent times with that beacon or any different beacon as the case may be.

From a security perspective, user verification methodologies as known in the art may be employed if desired, such as PIN code entry, biometrics such as fingerprint or retina scans, etc. This may be used as a manner of verifying the identity of a user during the beacon interaction and communications processes. Similarly, encryption and data obfuscation techniques may be utilized to ensure that data being transmitted between beacons as described herein cannot be intercepted and understood.

Fourth Aspect of the Invention—GPS/Beacon Switching

Figure 9:
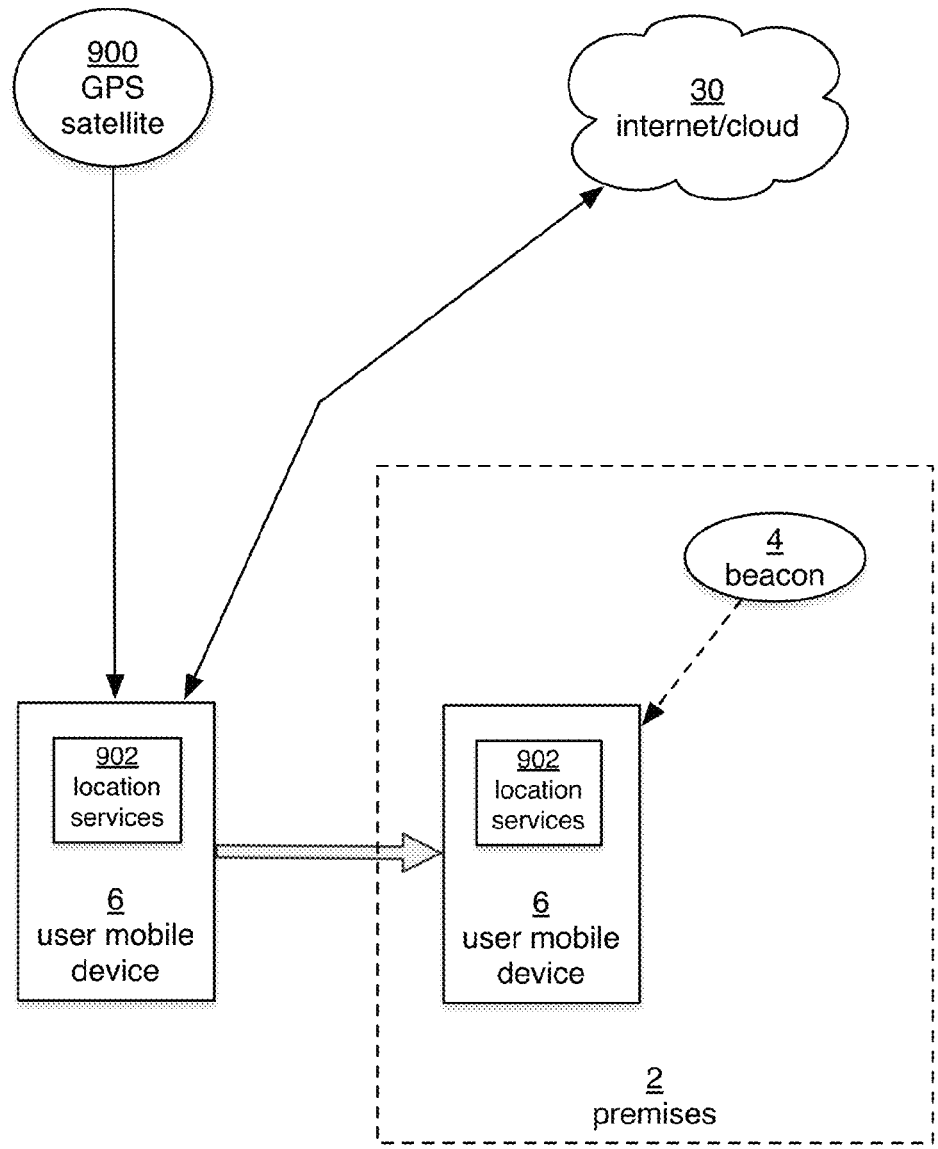
FIG. 9 is a block diagram of a fourth aspect of the invention that switches between GPS and beacon location methodologies.
Figure 10:
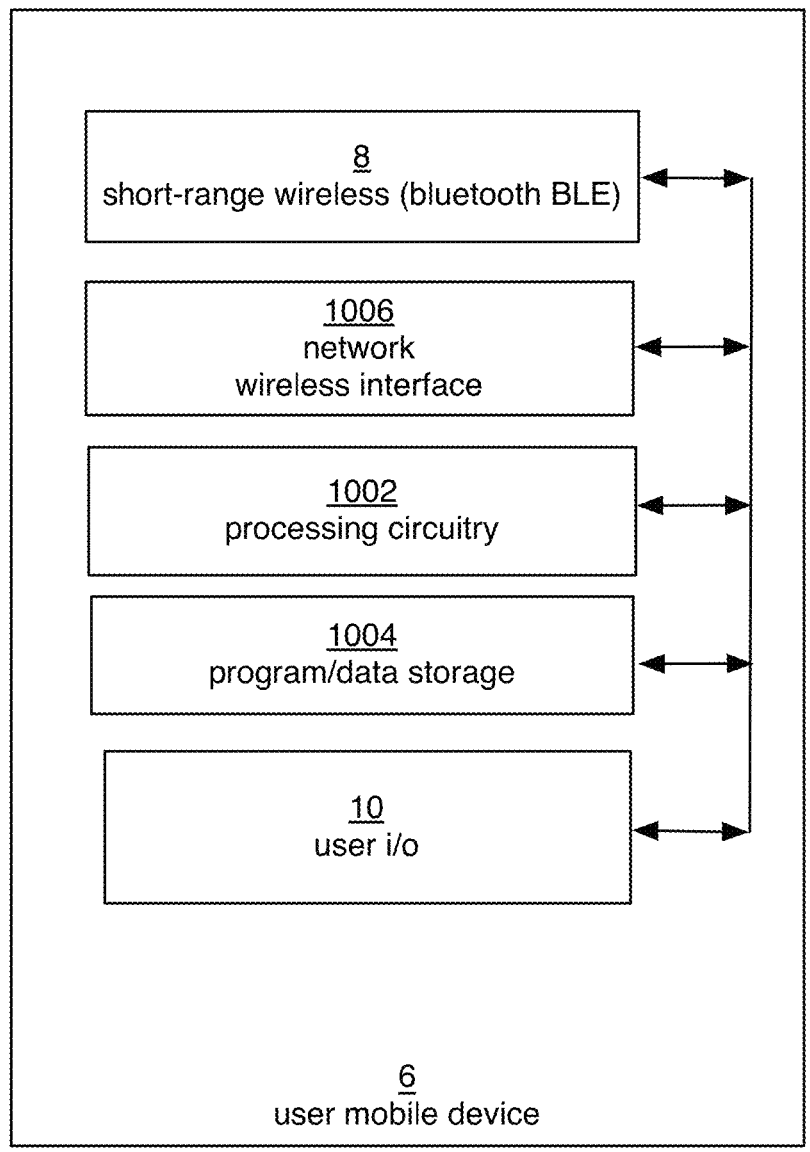
FIG. 10 is a block diagram of a mobile device used with this invention.

In a fourth aspect of the invention, the user mobile device 6 is capable of switching between GPS and beacon location modes, either automatically or manually, depending on the location of the device 6. As previously mentioned, GPS technology is in mainstream use and provides the ability of GPS-equipped devices to ascertain their location. This usually will only work outdoors, since GPS receivers rely on line of sight to several GPS satellites that orbit above the earth. That is, once the GPS receiver is moved indoors (or in a tunnel, etc.) and can no longer receive the signals transmitted by the GPS satellites, then the GPS receiver cannot continue to track its location. Thus, when the user mobile device, which in this case is equipped with a GPS receiver (such as an IPHONE), travels around outdoors, it is within the line of sight of one or more GPS satellites 900 as shown in FIG. 9. In FIG. 9, the mobile device 6 is shown having a module referred to as location services 902, which uses one or more types of external input to ascertain the location of the mobile device. Various applications that execute on the mobile device 6 can use the location information generated by the location services 902 on the mobile device. For example, a mapping program could illustrate to the user where on a map the device (and the user) are located. Or, a mobile shopping app could ascertain that the user is located near a TARGET store and generate a TARGET coupon or other incentive.

Since GPS technology will generally not work indoors, the user mobile device will be unable to determine its location with any accuracy once it enters an indoor location and ceases reception of the GPS signals. For example, a user may enter an indoor shopping mall, and the device will know it has entered the mall but will be unable to track the user's travels throughout the mall. This aspect of the invention enables the location services module 902 to detect when it has ceased reception of the GPS signals, and will then utilize the beacon technologies heretofore described in order to continue to track the location of the device 6 while indoors at the mall, as shown in FIG. 9. This may be accomplished through an automatic switching mechanism embedded in the location services module or in the operating system, or optionally in any application that utilizes the information provided by the location services module. Thus, once the GPS signal strength drops below a certain threshold amount, and the device can no longer process its location via GPS, then the beacon technology will initiate and continue to track the location inside the premises. This can switch back once the device has left the premises and can receive GPS signals in measurable strength again. In addition to this automatic switching between GPS and beacon location technologies, a user provide a manual selection of which technology he or she would like to use at a given time. For example, when the user travels around outdoors he may select use of the GPS signals, and once he enters a building he may then manually select use of the beacon signals.

Other Applications of the Intelligent Beacon Systems

Gaming and Rewards

Beacons may be used in a gaming and/or rewards environment, as will now be described. Beacons that communicate with each other as described throughout this application may engage in a gaming scenario. Various games may be executed between two or more beacons in various ways. For example, users could participate in a geocaching game in which a control beacon sends out location coordinates to participating beacons, and the participating beacons display a map to the user that enable the user to travel to that location. Once the beacon arrives at that location it can send back its coordinates to the control beacon for verification purposes. The user may be required to enter certain information or answers questions about the target locations for additional verifications. Users who accomplish these tasks could be given rewards such as reward points or other shopping incentives. For example, a contest game could be implemented in which the first user to travel to certain locations in a store, and verify their travels as mentioned above, receive a $10 coupon off their next purchase at that store. In addition, sweepstakes and gambling methodologies could be implemented with the intelligent beacons described herein.

Reservations

Beacons may be used for making reservations with a restaurant or other type of establishment. As described with respect to the per grooming example above, the beacon app would integrate with the user's calendar app on his mobile device so as to make the reservation process seamless and require little manual effort by the user.

Third Party Network Subscriptions

Merchants and other uses of the beacons may implement their own dedicated system by providing, programming, and otherwise maintaining beacons as described herein. In the alternative, third party providers may be implemented that provide this service to customers such as merchants in a turnkey operation, thus relieving those merchants and other users of the tasks involved in implementing these systems.

What is claimed is:

1. A computer-implemented method of processing a wireless beacon signal comprising:
   a mobile device receiving from a beacon a wireless beacon signal;
   the mobile device determining a beacon identifier from the wireless beacon signal;
   the mobile device pre-processing the beacon identifier with a beacon filter manager; and
   the mobile device enabling a mobile application associated with the beacon identifier to process the beacon identifier if allowed by the beacon filter manager;
   wherein the beacon filter manager applies a utilization filter;
   wherein the utilization filter performs the steps of
      counting the number of beacon signals that have been previously received from a beacon source identified in the beacon identifier; and
      allowing the mobile application associated with the beacon identifier to process the beacon identifier if the number of beacon signals that have been previously received from the beacon source identified in the beacon identifier does not exceed a predetermined threshold.

2. The method of claim 1 wherein the beacon filter manager executes locally on the mobile device.

3. The method of claim 2 wherein the beacon filter manager is an application called by an operating system executing on the mobile device.

4. The method of claim 2 wherein the beacon filter manager is integrated within an operating system executing on the mobile device.

5. The method of claim 1 wherein the beacon filter manager executes remotely using cloud-based services.

6. The method of claim 1 further comprising the step of the mobile device executing a post-processing routine after the mobile application associated with the beacon identifier has at least partially processed the beacon identifier.

7. The method of claim 6 wherein the post processing routing comprises a product comparison service.

8. The method of claim 7 wherein the product comparison service generates a query to a plurality of resources on the Internet to determine information regarding a product associated with the mobile application.

9. The method of claim 8 wherein results of the query from the plurality of resources are provided to the mobile device.

10. The method of claim 6 wherein the post processing routing comprises a web search.

11. The method of claim 10 wherein results of the web search are provided to the mobile device.

12. The method of claim 6 wherein the post processing routine comprises a transaction execution service.

13. The method of claim 6 wherein the post processing routine comprises a beacon rating service.

14. The method of claim 6 wherein the post processing routine comprises a calendar integration service.

15. The method of claim 6 wherein the post processing routine comprises a weather information integration service.

16. The method of claim 6 wherein the post processing routine comprises a traffic information integration service.

17. A computer-implemented method of processing a wireless beacon signal comprising:
a mobile device receiving from a beacon a wireless beacon signal;
the mobile device determining a beacon identifier from the wireless beacon signal;
the mobile device pre-processing the beacon identifier with a beacon filter manager; and
the mobile device enabling a mobile application associated with the beacon identifier to process the beacon identifier if allowed by the beacon filter manager;
wherein the beacon filter manager applies a utilization filter;
wherein the utilization filter performs the steps of
counting the number of beacon signals that have been previously received from a category type associated with a beacon source identified in the beacon identifier;
allowing the mobile application associated with the beacon identifier to process the beacon identifier if the number of beacon signals that have been previously received from the category type associated with the beacon source identified in the beacon identifier does not exceed a predetermined threshold.

18. The method of claim 17 wherein the beacon filter manager executes locally on the mobile device.

19. The method of claim 18 wherein the beacon filter manager is an application called by an operating system executing on the mobile device.

20. The method of claim 18 wherein the beacon filter manager is integrated within an operating system executing on the mobile device.

21. The method of claim 17 wherein the beacon filter manager executes remotely using cloud-based services.

22. The method of claim 17 further comprising the step of the mobile device executing a post-processing routine after the mobile application associated with the beacon identifier has at least partially processed the beacon identifier.

23. The method of claim 22 wherein the post processing routing comprises a product comparison service.

24. The method of claim 23 wherein the product comparison service generates a query to a plurality of resources on the Internet to determine information regarding a product associated with the mobile application.

25. The method of claim 24 wherein results of the query from the plurality of resources are provided to the mobile device.

26. The method of claim 22 wherein the post processing routing comprises a web search.

27. The method of claim 26 wherein results of the web search are provided to the mobile device.

28. The method of claim 22 wherein the post processing routine comprises a transaction execution service.

29. The method of claim 22 wherein the post processing routine comprises a beacon rating service.

30. The method of claim 22 wherein the post processing routine comprises a calendar integration service.

31. The method of claim 22 wherein the post processing routine comprises a weather information integration service.

32. The method of claim 22 wherein the post processing routine comprises a traffic information integration service.

33. A mobile device comprising processing circuitry, program storage, a user input device, a user output device, a short range wireless interface for short range communication with a beacon, and a network interface for wireless communications with a network, wherein the program storage stores program code for programming the processing circuitry to:
receive a wireless beacon signal from a beacon via the short-range wireless interface;
determine a beacon identifier from the wireless beacon signal;
pre-process the beacon identifier with a beacon filter manager; and
enable a mobile application associated with the beacon identifier to process the beacon identifier if allowed by the beacon filter manager;
wherein the beacon filter manager applies a utilization filter;
wherein the utilization filter performs the steps of
counting the number of beacon signals that have been previously received from a beacon source identified in the beacon identifier; and
allowing the mobile application associated with the beacon identifier to process the beacon identifier if the number of beacon signals that have been previously received from the beacon source identified in the beacon identifier does not exceed a predetermined threshold.

34. The mobile device of claim 33 wherein the beacon filter manager is stored locally in the program storage on the mobile device.

35. The mobile device of claim 34 wherein the beacon filter manager is an application called by an operating system executing on the mobile device.

36. The mobile device of claim 34 wherein the beacon filter manager is integrated within an operating system executing on the mobile device.

37. The mobile device of claim 33 wherein the beacon filter manager is stored remotely on an external server computer and is accessed via the network interface.

38. The mobile device of claim 33 wherein the processing circuitry is further programmed to execute a post-processing routine after the mobile application associated with the beacon identifier has at least partially processed the beacon identifier.

39. The mobile device of claim 38 wherein the post processing routing comprises a product comparison service.

40. The mobile device of claim 39 wherein the product comparison service generates a query to a plurality of resources on the Internet to determine information regarding a product associated with the mobile application.

41. The mobile device of claim 40 wherein results of the query from the plurality of resources are provided to the mobile device.

42. The mobile device of claim 38 wherein the post processing routing comprises a web search.

43. The mobile device of claim 42 wherein results of the web search are provided to the mobile device.

44. The mobile device of claim 38 wherein the post processing routine comprises a transaction execution service.

45. The mobile device of claim 38 wherein the post processing routine comprises a beacon rating service.

46. The mobile device of claim 38 wherein the post processing routine comprises a calendar integration service.

47. The mobile device of claim 38 wherein the post processing routine comprises a weather information integration service.

48. The mobile device of claim 38 wherein the post processing routine comprises a traffic information integration service.

49. A mobile device comprising processing circuitry, program storage, a user input device, a user output device, a short range wireless interface for short range communication with a beacon, and a network interface for wireless communications with a network, wherein the program storage stores program code for programming the processing circuitry to:
- receive a wireless beacon signal from a beacon via the short-range wireless interface;
- determine a beacon identifier from the wireless beacon signal;
- pre-process the beacon identifier with a beacon filter manager; and
- enable a mobile application associated with the beacon identifier to process the beacon identifier if allowed by the beacon filter manager;
- wherein the beacon filter manager applies a utilization filter;
- wherein the utilization filter performs the steps of
  - counting the number of beacon signals that have been previously received from a category type associated with a beacon source identified in the beacon identifier;
  - allowing the mobile application associated with the beacon identifier to process the beacon identifier if the number of beacon signals that have been previously received from the category type associated with the beacon source identified in the beacon identifier does not exceed a predetermined threshold.

50. The mobile device of claim 49 wherein the beacon filter manager is stored locally in the program storage on the mobile device.

51. The mobile device of claim 50 wherein the beacon filter manager is an application called by an operating system executing on the mobile device.

52. The mobile device of claim 50 wherein the beacon filter manager is integrated within an operating system executing on the mobile device.

53. The mobile device of claim 49 wherein the beacon filter manager is stored remotely on an external server computer and is accessed via the network interface.

54. The mobile device of claim 49 wherein the processing circuitry is further programmed to execute a post-processing routine after the mobile application associated with the beacon identifier has at least partially processed the beacon identifier.

55. The mobile device of claim 54 wherein the post processing routing comprises a product comparison service.

56. The mobile device of claim 55 wherein the product comparison service generates a query to a plurality of resources on the Internet to determine information regarding a product associated with the mobile application.

57. The mobile device of claim 56 wherein results of the query from the plurality of resources are provided to the mobile device.

58. The mobile device of claim 54 wherein the post processing routing comprises a web search.

59. The mobile device of claim 58 wherein results of the web search are provided to the mobile device.

60. The mobile device of claim 54 wherein the post processing routine comprises a transaction execution service.

61. The mobile device of claim 54 wherein the post processing routine comprises a beacon rating service.

62. The mobile device of claim 54 wherein the post processing routine comprises a calendar integration service.

63. The mobile device of claim 54 wherein the post processing routine comprises a weather information integration service.

64. The mobile device of claim 54 wherein the post processing routine comprises a traffic information integration service.

* * * * *